(12) United States Patent
Zewail et al.

(10) Patent No.: US 12,574,797 B2
(45) Date of Patent: Mar. 10, 2026

(54) PHYSICAL DOWNLINK CONTROL CHANNEL RATE CONTROL

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 18/347,939

(22) Filed: Jul. 6, 2023

(65) Prior Publication Data

US 2025/0016617 A1    Jan. 9, 2025

(51) Int. Cl.
*H04W 28/06*        (2009.01)
*H04W 72/12*        (2023.01)
*H04W 72/232*       (2023.01)

(52) U.S. Cl.
CPC ........... *H04W 28/06* (2013.01); *H04W 72/12* (2013.01); *H04W 72/232* (2023.01)

(58) Field of Classification Search
CPC ... H04W 28/06; H04W 72/12; H04W 72/232; H04L 5/0044; H04L 1/0046; H04L 5/0053; H04L 1/0025; H04L 1/0072
See application file for complete search history.

(56) References Cited

U.S. PATENT DOCUMENTS

| | | | |
|---|---|---|---|
| 2023/0057351 A1* | 2/2023 | Ye | H04W 52/367 |
| 2023/0156739 A1 | 5/2023 | Xu et al. | |

FOREIGN PATENT DOCUMENTS

WO    WO-2022133884 A1    6/2022

OTHER PUBLICATIONS

Intel Corporation: "Resource allocation and TBS", 3GPP TSG RAN WG1 Meeting #90bis, R1-1717393, 3rd Generation Partnership Project, Mobile Competence Centre, 650, Route Des Lucioles, F-06921, Sophia-Antipolis Cedex, France, vol. RAN WG1, No. Prague, Czech Republic, Oct. 9, 2017-Oct. 13, 2017, Oct. 3, 2017, 13 Pages, XP051352616, section 2.
International Search Report and Written Opinion—PCT/US2024/032861—ISA/EPO—Sep. 23, 2024.

* cited by examiner

*Primary Examiner* — Christopher M Brandt
(74) *Attorney, Agent, or Firm* — Holland & Hart LLP

(57)        ABSTRACT

Methods, systems, and devices for wireless communications are described. A user equipment (UE) may receive a control message indicating a coding rate value corresponding to a downlink control information (DCI) format. The coding rate value may indicate a coding rate of the DCI format. The UE may receive, via a quantity of resource elements (REs) that is based on a payload size and the coding rate value, a DCI message of the DCI format that includes scheduling information associated with a data message, and the UE may receive the data message in accordance with the scheduling information. In some examples, the UE may receive the DCI message via a physical downlink control channel (PDCCH) multiplexed with a physical downlink shared channel (PDSCH) that carries the data message.

29 Claims, 24 Drawing Sheets

Control Message

DCI Message

Data Message

205

210

215

105-a 115-a

200

1410

1420

1415

1405

1400

| Coding Rate Manager | DCI Manager |
|---|---|
| 1625 | 1630 |
| Data Message Manager | Modulation Manager |
| 1635 | 1640 |

1620

1600

130

105

115

Network
Entity

Transceiver

1710

Antenna

1715

Communications
Manager

1720

Memory

Code

1730

1725

1740

Processor

1735

1705

1700

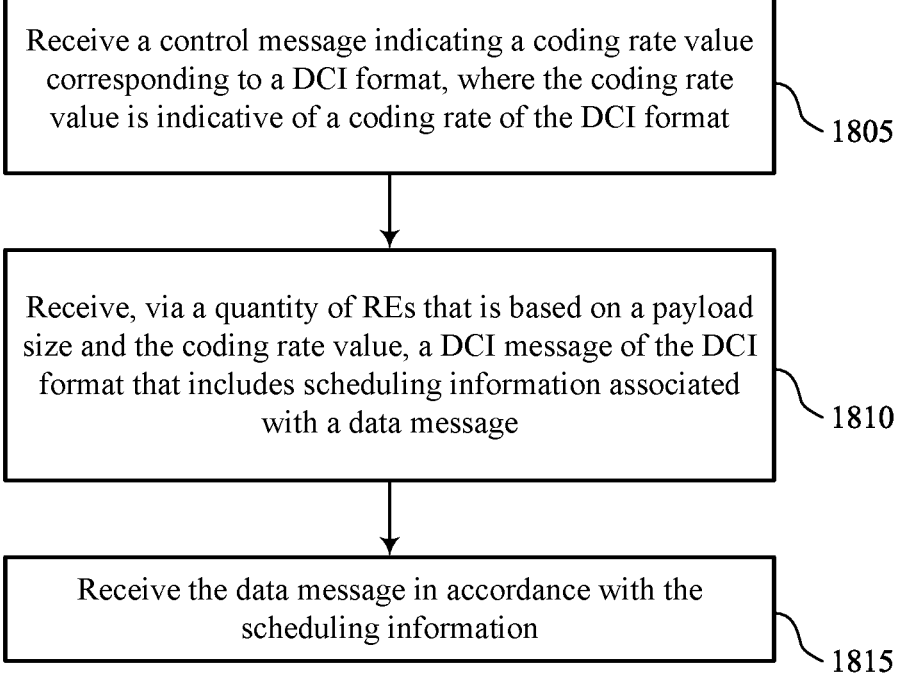

Receive a control message indicating a coding rate value corresponding to a DCI format, where the coding rate value is indicative of a coding rate of the DCI format

1805

Receive, via a quantity of REs that is based on a payload size and the coding rate value, a DCI message of the DCI format that includes scheduling information associated with a data message

1810

Receive the data message in accordance with the scheduling information

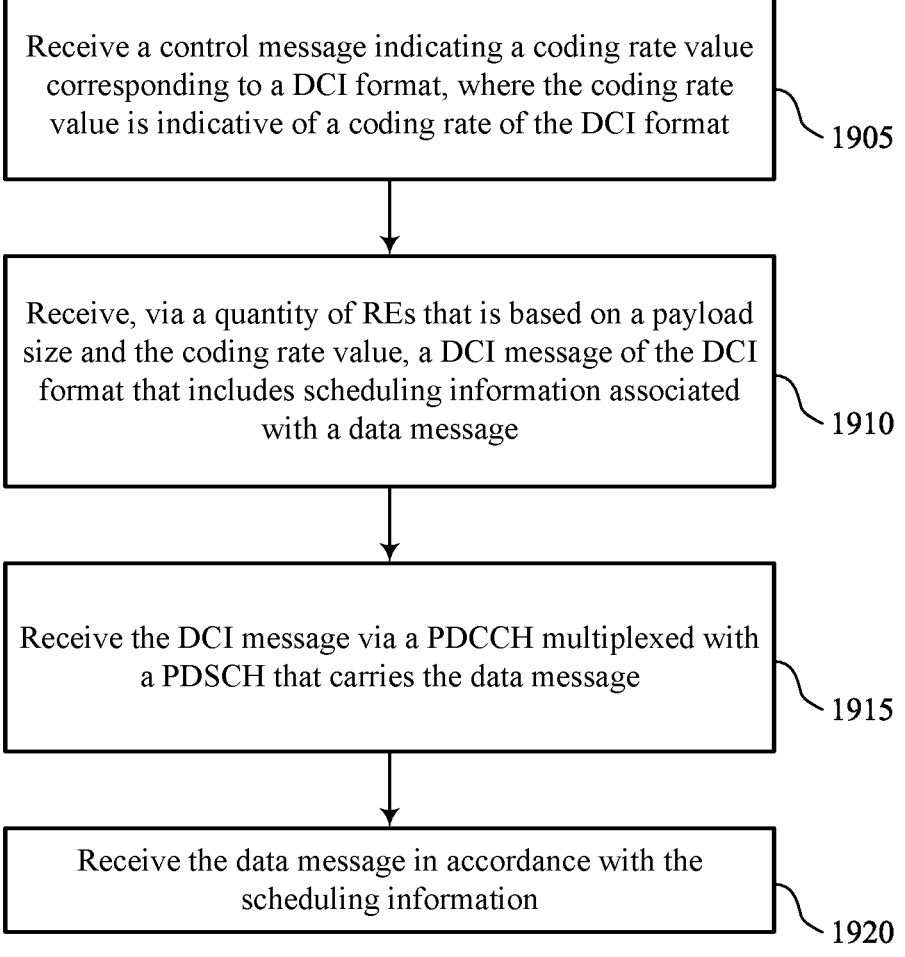

Receive a control message indicating a coding rate value corresponding to a DCI format, where the coding rate value is indicative of a coding rate of the DCI format

⟍ 1905

Receive, via a quantity of REs that is based on a payload size and the coding rate value, a DCI message of the DCI format that includes scheduling information associated with a data message

⟍ 1910

Receive the DCI message via a PDCCH multiplexed with a PDSCH that carries the data message

⟍ 1915

Receive the data message in accordance with the scheduling information

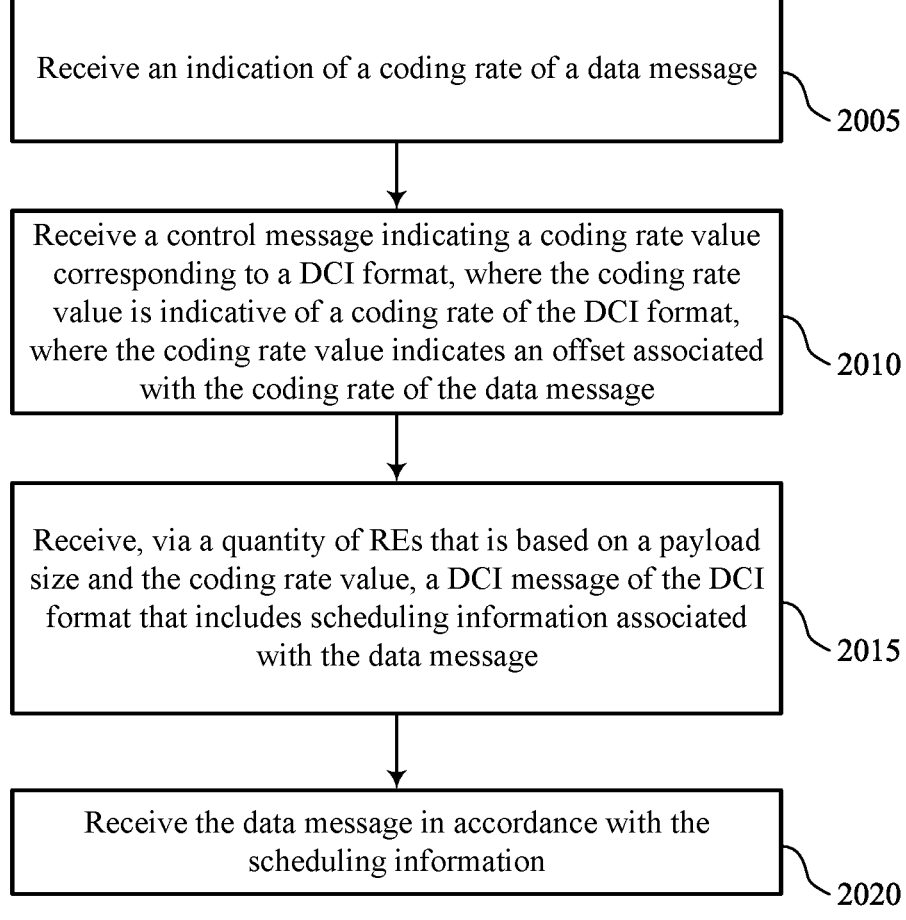

Receive an indication of a coding rate of a data message

2005

Receive a control message indicating a coding rate value corresponding to a DCI format, where the coding rate value is indicative of a coding rate of the DCI format, where the coding rate value indicates an offset associated with the coding rate of the data message

2010

Receive, via a quantity of REs that is based on a payload size and the coding rate value, a DCI message of the DCI format that includes scheduling information associated with the data message

2015

Receive the data message in accordance with the scheduling information

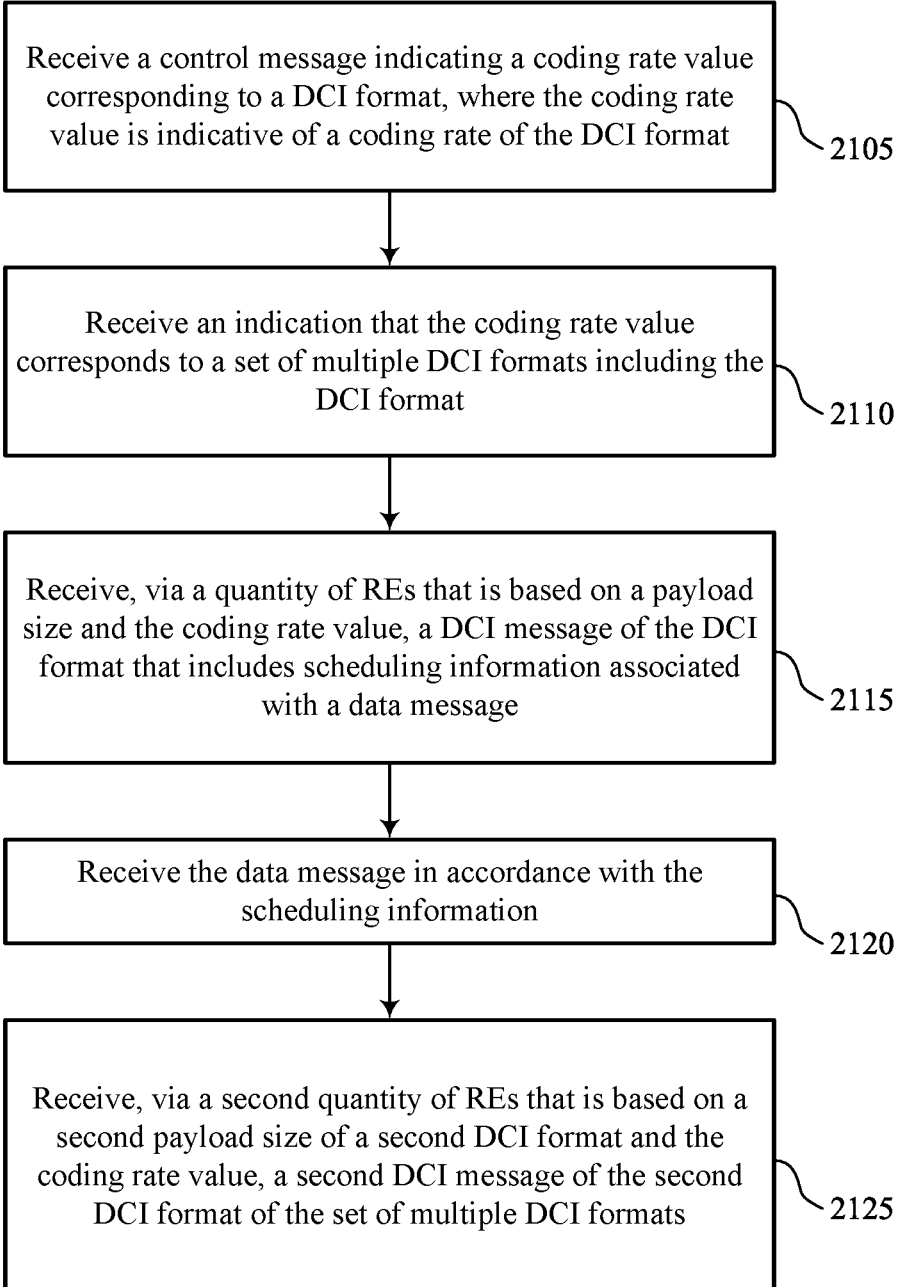

Receive a control message indicating a coding rate value corresponding to a DCI format, where the coding rate value is indicative of a coding rate of the DCI format

2105

Receive an indication that the coding rate value corresponds to a set of multiple DCI formats including the DCI format

2110

Receive, via a quantity of REs that is based on a payload size and the coding rate value, a DCI message of the DCI format that includes scheduling information associated with a data message

2115

Receive the data message in accordance with the scheduling information

2120

Receive, via a second quantity of REs that is based on a second payload size of a second DCI format and the coding rate value, a second DCI message of the second DCI format of the set of multiple DCI formats

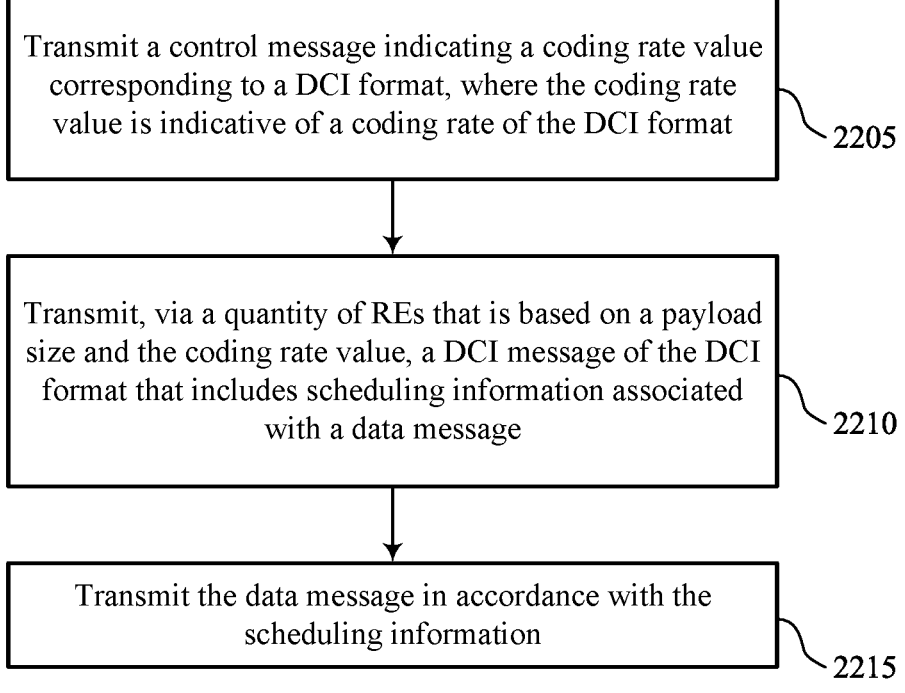

Transmit a control message indicating a coding rate value corresponding to a DCI format, where the coding rate value is indicative of a coding rate of the DCI format — 2205

Transmit, via a quantity of REs that is based on a payload size and the coding rate value, a DCI message of the DCI format that includes scheduling information associated with a data message — 2210

Transmit the data message in accordance with the scheduling information — 2215

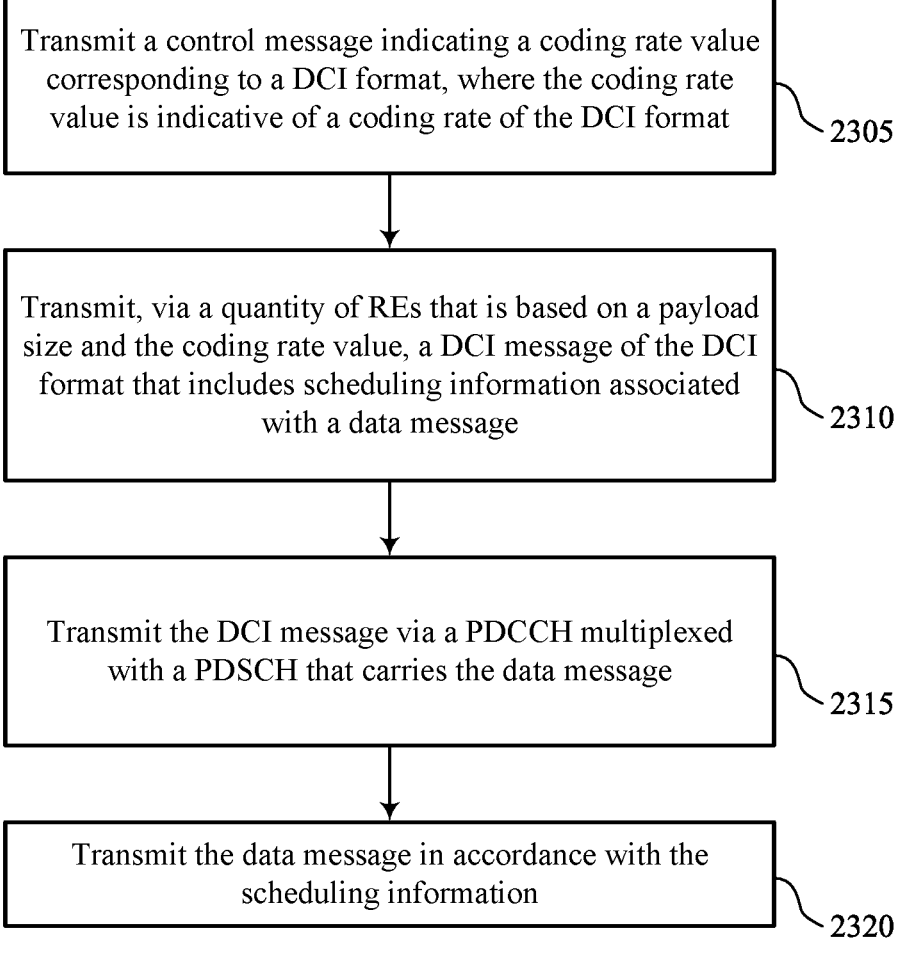

Transmit a control message indicating a coding rate value corresponding to a DCI format, where the coding rate value is indicative of a coding rate of the DCI format ⟍2305

Transmit, via a quantity of REs that is based on a payload size and the coding rate value, a DCI message of the DCI format that includes scheduling information associated with a data message ⟍2310

Transmit the DCI message via a PDCCH multiplexed with a PDSCH that carries the data message ⟍2315

Transmit the data message in accordance with the scheduling information ⟍2320

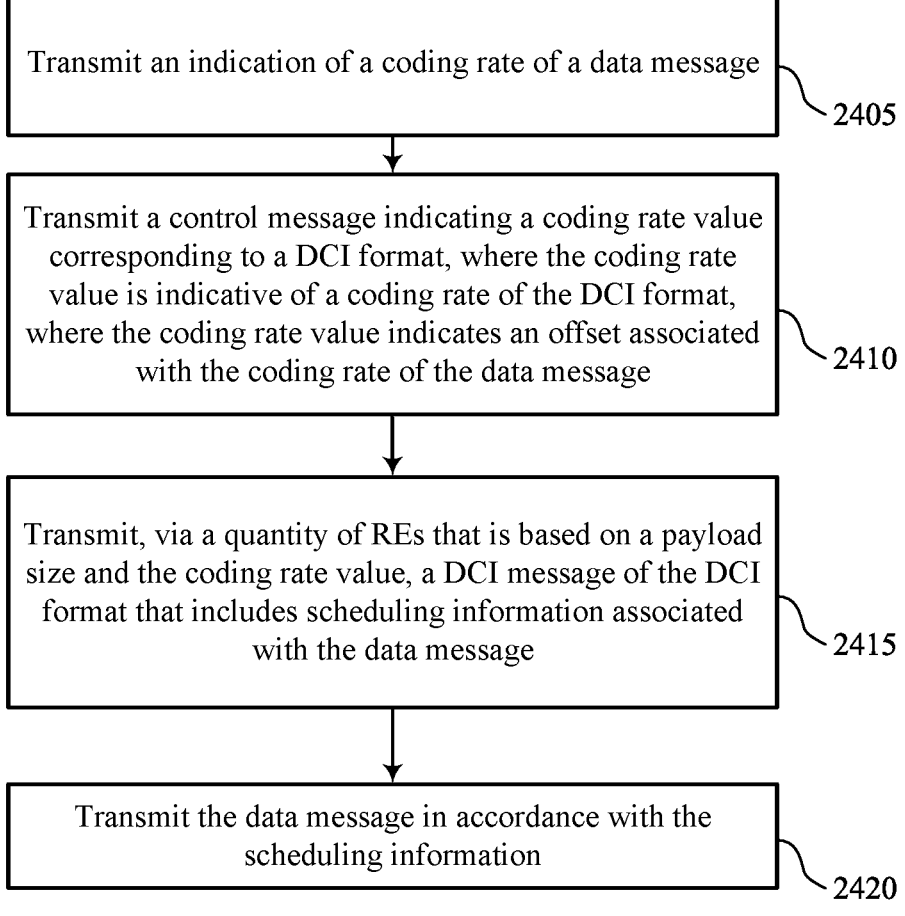

Transmit an indication of a coding rate of a data message

2405

Transmit a control message indicating a coding rate value corresponding to a DCI format, where the coding rate value is indicative of a coding rate of the DCI format, where the coding rate value indicates an offset associated with the coding rate of the data message

2410

Transmit, via a quantity of REs that is based on a payload size and the coding rate value, a DCI message of the DCI format that includes scheduling information associated with the data message

2415

Transmit the data message in accordance with the scheduling information

PHYSICAL DOWNLINK CONTROL CHANNEL RATE CONTROL

FIELD OF TECHNOLOGY

The following relates to wireless communications, including physical downlink control channel (PDCCH) rate control.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). In some examples, a UE may receive downlink control information (DCI) that schedules a data message.

SUMMARY

The described techniques relate to improved methods, systems, devices, and apparatuses that support physical downlink control channel (PDCCH) rate control. For example, the described techniques provide for a user equipment (UE) that receives an indication of one or more coding rate values from a network entity that indicate a coding rate for decoding a downlink control information (DCI) message of a PDCCH. The one or more coding rate values may correspond to respective DCI formats (such that each respective coding rate value corresponds to a respective DCI format), or the one or more coding rate values may be applicable to any DCI format (such that a coding rate value may correspond to one or multiple DCI formats). In some examples, multiple coding rate values may apply to the same DCI format. The UE may receive a DCI message from the network entity via a quantity of resource elements (REs) that is based on a coding rate value and based on a resource allocation unit. In some examples, the resource allocation unit may be based on a payload size of the DCI message, at least one of the one or more coding rate values, or any combination thereof. As such, a resource allocation unit associated with DCI transmission and reception may vary (such as be a function of) payload size, as opposed to being static regardless of payload size. The PDCCH may be multiplexed with a physical downlink shared channel (PDSCH) that carries a data message scheduled by the DCI message.

A method for wireless communication by a UE is described. The method may include receiving a control message indicating a coding rate value corresponding to a DCI format, where the coding rate value is indicative of a coding rate of the DCI format, receiving, via a quantity of REs that is based on a payload size and the coding rate value, a DCI message of the DCI format that includes scheduling information associated with a data message, and receiving the data message in accordance with the scheduling information.

A UE for wireless communication is described. The UE may include at least one processor, and at least one memory coupled with the at least one processor, with instructions stored in the at least one memory. The instructions may be executable by the at least one processor, individually or in any combination, to cause the UE to receive a control message indicating a coding rate value corresponding to a DCI format, where the coding rate value is indicative of a coding rate of the DCI format, receive, via a quantity of REs that is based on a payload size and the coding rate value, a DCI message of the DCI format that includes scheduling information associated with a data message, and receive the data message in accordance with the scheduling information.

Another UE for wireless communication is described. The UE may include means for receiving a control message indicating a coding rate value corresponding to a DCI format, where the coding rate value is indicative of a coding rate of the DCI format, means for receiving, via a quantity of REs that is based on a payload size and the coding rate value, a DCI message of the DCI format that includes scheduling information associated with a data message, and means for receiving the data message in accordance with the scheduling information.

A non-transitory computer-readable medium storing code for wireless communication is described. The code may include instructions executable by at least one processor to receive a control message indicating a coding rate value corresponding to a DCI format, where the coding rate value is indicative of a coding rate of the DCI format, receive, via a quantity of REs that is based on a payload size and the coding rate value, a DCI message of the DCI format that includes scheduling information associated with a data message, and receive the data message in accordance with the scheduling information.

In some examples of the method, UEs, and non-transitory computer-readable medium described herein, receiving the DCI message may include operations, features, means, or instructions for receiving the DCI message via a PDCCH multiplexed with a PDSCH that carries the data message.

Some examples of the method, UEs, and non-transitory computer-readable medium described herein may further include operations, features, means, or instructions for receiving an indication of a coding rate of the data message, where the coding rate value indicates an offset associated with the coding rate of the data message.

In some examples of the method, UEs, and non-transitory computer-readable medium described herein, receiving the control message may include operations, features, means, or instructions for receiving an indication that the coding rate value corresponds to a set of multiple DCI formats including the DCI format.

Some examples of the method, UEs, and non-transitory computer-readable medium described herein may further include operations, features, means, or instructions for receiving, via a second quantity of REs that may be based on a second payload size of a second DCI format and the coding rate value, a second DCI message of the second DCI format of the set of multiple DCI formats.

In some examples of the method, UEs, and non-transitory computer-readable medium described herein, receiving the control message may include operations, features, means, or instructions for receiving indications of a set of multiple coding rate values including the coding rate value, where each of the set of multiple coding rate values corresponds to a respective DCI format of a set of multiple DCI formats.

In some examples of the method, UEs, and non-transitory computer-readable medium described herein, a second coding rate value corresponding to a second DCI format of the set of multiple DCI formats indicates a second coding rate higher than the coding rate based on a second payload size of the second DCI format being larger than the payload size.

In some examples of the method, UEs, and non-transitory computer-readable medium described herein, a second coding rate value corresponding to a second DCI format of the set of multiple DCI formats indicates a second coding rate lower than the coding rate based on a second payload size of the second DCI format being smaller than the payload size.

Some examples of the method, UEs, and non-transitory computer-readable medium described herein may further include operations, features, means, or instructions for selecting the quantity of REs via which the DCI message may be received based on a second quantity of REs associated with a second DCI format with a largest payload size relative to other DCI formats, where the quantity of REs equals the second quantity of REs.

Some examples of the method, UEs, and non-transitory computer-readable medium described herein may further include operations, features, means, or instructions for selecting the quantity of REs via which the DCI message may be received based on a second quantity of REs associated with a second DCI format with a smallest payload size relative to other DCI formats, where the quantity of REs equals the second quantity of REs.

Some examples of the method, UEs, and non-transitory computer-readable medium described herein may further include operations, features, means, or instructions for demodulating a set of multiple REs of a PDCCH and performing, using the set of multiple REs, one or more blind decoding (BD) attempts for the DCI message in accordance with the payload size and the coding rate value, where receiving the DCI message may be based on performing the one or more BD attempts.

In some examples of the method, UEs, and non-transitory computer-readable medium described herein, performing the one or more BD attempts may include operations, features, means, or instructions for performing a first set of one or more BD attempts using one or more first resource element sets each associated with a first aggregation level and performing a second set of one or more BD attempts using one or more second resource element sets each associated with a second aggregation level, where each of the one or more first resource element sets and the one or more second resource element sets at least partially span the set of multiple REs, and where the quantity of REs via which the DCI message may be received may be further based on the first aggregation level or the second aggregation level.

In some examples of the method, UEs, and non-transitory computer-readable medium described herein, receiving the control message may include operations, features, means, or instructions for receiving an indication that both a first coding rate value and a second coding rate value correspond to the DCI format, where the first coding rate value and the second coding rate value may be indicative of a first coding rate and a second coding rate, respectively, of the DCI format, and where the coding rate value may be one of the first coding rate value and the second coding rate value.

Some examples of the method, UEs, and non-transitory computer-readable medium described herein may further include operations, features, means, or instructions for demodulating a set of multiple REs of a PDCCH and performing, using the set of multiple REs, one or more BD attempts for the DCI message in accordance with both the first coding rate value and the second coding rate value.

In some examples of the method, UEs, and non-transitory computer-readable medium described herein, performing the one or more BD attempts in accordance with both the first coding rate value and the second coding rate value may include operations, features, means, or instructions for performing a first set of one or more BD attempts using one or more first resource element sets each associated with a first quantity of REs that may be based on the payload size and the first coding rate value and performing a second set of one or more BD attempts using one or more second resource element sets each associated with a second quantity of REs that may be based on the payload size and the second coding rate value, where each of the one or more first resource element sets and the one or more second resource element sets at least partially span the set of multiple REs, and where the quantity of REs via which the DCI message may be received may be one of the first quantity of REs or the second quantity of REs.

Some examples of the method, UEs, and non-transitory computer-readable medium described herein may further include operations, features, means, or instructions for demodulating a first set of multiple REs of a PDCCH in accordance with a first modulation scheme, performing, using the first set of multiple REs demodulated in accordance with the first modulation scheme, a first set of one or more BD attempts for the DCI message in accordance with the payload size and the coding rate value, demodulating a second set of multiple REs of the PDCCH in accordance with a second modulation scheme, the second set of multiple REs at least partially overlapping with the first set of multiple REs, and performing, using the second set of multiple REs demodulated in accordance with the second modulation scheme, a second set of one or more BD attempts for the DCI message in accordance with the payload size and the coding rate value, where receiving the DCI message may be based on performing one of the first set of one or more BD attempts or the second set of one or more BD attempts.

In some examples of the method, UEs, and non-transitory computer-readable medium described herein, each of a set of multiple DCI formats including the DCI format may be associated with a respective quantity of REs based on a respective payload size and a respective coding rate value.

In some examples of the method, UEs, and non-transitory computer-readable medium described herein, a resource allocation unit associated with the DCI format may be a function of the payload size, the quantity of REs being further based on the resource allocation unit.

In some examples of the method, UEs, and non-transitory computer-readable medium described herein, the control message may be received via a radio resource control (RRC) message, a medium access control-control element (MAC-CE) message, or a previous DCI message.

A method for wireless communication by a network entity is described. The method may include transmitting a control message indicating a coding rate value corresponding to a DCI format, where the coding rate value is indicative of a coding rate of the DCI format, transmitting, via a quantity of REs that is based on a payload size and the coding rate value, a DCI message of the DCI format that includes scheduling information associated with a data message, and transmitting the data message in accordance with the scheduling information.

A network entity for wireless communication is described. The network entity may include at least one processor, and at least one memory coupled with the at least one processor, with instructions stored in the at least one memory. The instructions may be executable by the at least one processor, individually or in any combination, to cause the network entity to transmit a control message indicating a coding rate value corresponding to a DCI format, where the coding rate value is indicative of a coding rate of the DCI format, transmit, via a quantity of REs that is based on a payload size and the coding rate value, a DCI message of the DCI format that includes scheduling information associated with a data message, and transmit the data message in accordance with the scheduling information.

Another network entity for wireless communication is described. The network entity may include means for transmitting a control message indicating a coding rate value corresponding to a DCI format, where the coding rate value is indicative of a coding rate of the DCI format, means for transmitting, via a quantity of REs that is based on a payload size and the coding rate value, a DCI message of the DCI format that includes scheduling information associated with a data message, and means for transmitting the data message in accordance with the scheduling information.

A non-transitory computer-readable medium storing code for wireless communication is described. The code may include instructions executable by at least one processor to transmit a control message indicating a coding rate value corresponding to a DCI format, where the coding rate value is indicative of a coding rate of the DCI format, transmit, via a quantity of REs that is based on a payload size and the coding rate value, a DCI message of the DCI format that includes scheduling information associated with a data message, and transmit the data message in accordance with the scheduling information.

In some examples of the method, network entities, and non-transitory computer-readable medium described herein, transmitting the DCI message may include operations, features, means, or instructions for transmitting the DCI message via a PDCCH multiplexed with a PDSCH that carries the data message.

Some examples of the method, network entities, and non-transitory computer-readable medium described herein may further include operations, features, means, or instructions for transmitting an indication of a coding rate of the data message, where the coding rate value indicates an offset associated with the coding rate of the data message.

In some examples of the method, network entities, and non-transitory computer-readable medium described herein, transmitting the control message may include operations, features, means, or instructions for transmitting an indication that the coding rate value corresponds to a set of multiple DCI formats including the DCI format.

Some examples of the method, network entities, and non-transitory computer-readable medium described herein may further include operations, features, means, or instructions for transmitting, via a second quantity of REs that may be based on a second payload size of a second DCI format and the coding rate value, a second DCI message of the second DCI format of the set of multiple DCI formats.

In some examples of the method, network entities, and non-transitory computer-readable medium described herein, transmitting the control message may include operations, features, means, or instructions for transmitting indications of a set of multiple coding rate values including the coding rate value, each of the set of multiple coding rate values corresponding to a respective DCI format of a set of multiple DCI formats.

In some examples of the method, network entities, and non-transitory computer-readable medium described herein, a second coding rate value corresponding to a second DCI format of the set of multiple DCI formats indicates a second coding rate higher than the coding rate based on a second payload size of the second DCI format being larger than the payload size.

In some examples of the method, network entities, and non-transitory computer-readable medium described herein, a second coding rate value corresponding to a second DCI format of the set of multiple DCI formats indicates a second coding rate lower than the coding rate based on a second payload size of the second DCI format being smaller than the payload size.

Some examples of the method, network entities, and non-transitory computer-readable medium described herein may further include operations, features, means, or instructions for selecting the quantity of REs via which the DCI message may be transmitted based on a second quantity of REs associated with a second DCI format with a largest payload size relative to other DCI formats, where the quantity of REs equals the second quantity of REs.

Some examples of the method, network entities, and non-transitory computer-readable medium described herein may further include operations, features, means, or instructions for selecting the quantity of REs via which the DCI message may be transmitted based on a second quantity of REs associated with a second DCI format with a smallest payload size relative to other DCI formats, where the quantity of REs equals the second quantity of REs.

In some examples of the method, network entities, and non-transitory computer-readable medium described herein, transmitting the DCI message may include operations, features, means, or instructions for transmitting the DCI message in accordance with an aggregation level, where the quantity of REs via which the DCI message may be transmitted may be further based on the aggregation level.

In some examples of the method, network entities, and non-transitory computer-readable medium described herein, transmitting the control message may include operations, features, means, or instructions for transmitting an indication that both a first coding rate value and a second coding rate value correspond to the DCI format, where the first coding rate value and the second coding rate value may be indicative of a first coding rate and a second coding rate, respectively, of the DCI format, and where the coding rate value may be one of the first coding rate value and the second coding rate value.

In some examples of the method, network entities, and non-transitory computer-readable medium described herein, transmitting the DCI message may include operations, features, means, or instructions for transmitting a first DCI message of the DCI format via a first quantity of REs that may be based on the payload size and the first coding rate value and transmitting a second DCI message of the DCI format via a second quantity of REs that may be based on the payload size and the second coding rate value.

In some examples of the method, network entities, and non-transitory computer-readable medium described herein, transmitting the DCI message may include operations, features, means, or instructions for transmitting the DCI message in accordance with a modulation scheme, where the quantity of REs via which the DCI message may be transmitted may be further based on the modulation scheme.

In some examples of the method, network entities, and non-transitory computer-readable medium described herein, each of a set of multiple DCI formats including the DCI format may be associated with a respective quantity of REs based on a respective payload size and a respective coding rate value.

In some examples of the method, network entities, and non-transitory computer-readable medium described herein, a resource allocation unit associated with the DCI format may be a function of the payload size, the quantity of REs being further based on the resource allocation unit.

In some examples of the method, network entities, and non-transitory computer-readable medium described herein, the control message may be transmitted via a RRC message, a MAC-CE message, or a previous DCI message.

BRIEF DESCRIPTION OF THE DRAWINGS

FIGS. 18 through 24 show flowcharts illustrating methods that support PDCCH rate control in accordance with one or more aspects of the present disclosure.

DETAILED DESCRIPTION

Figure 1:
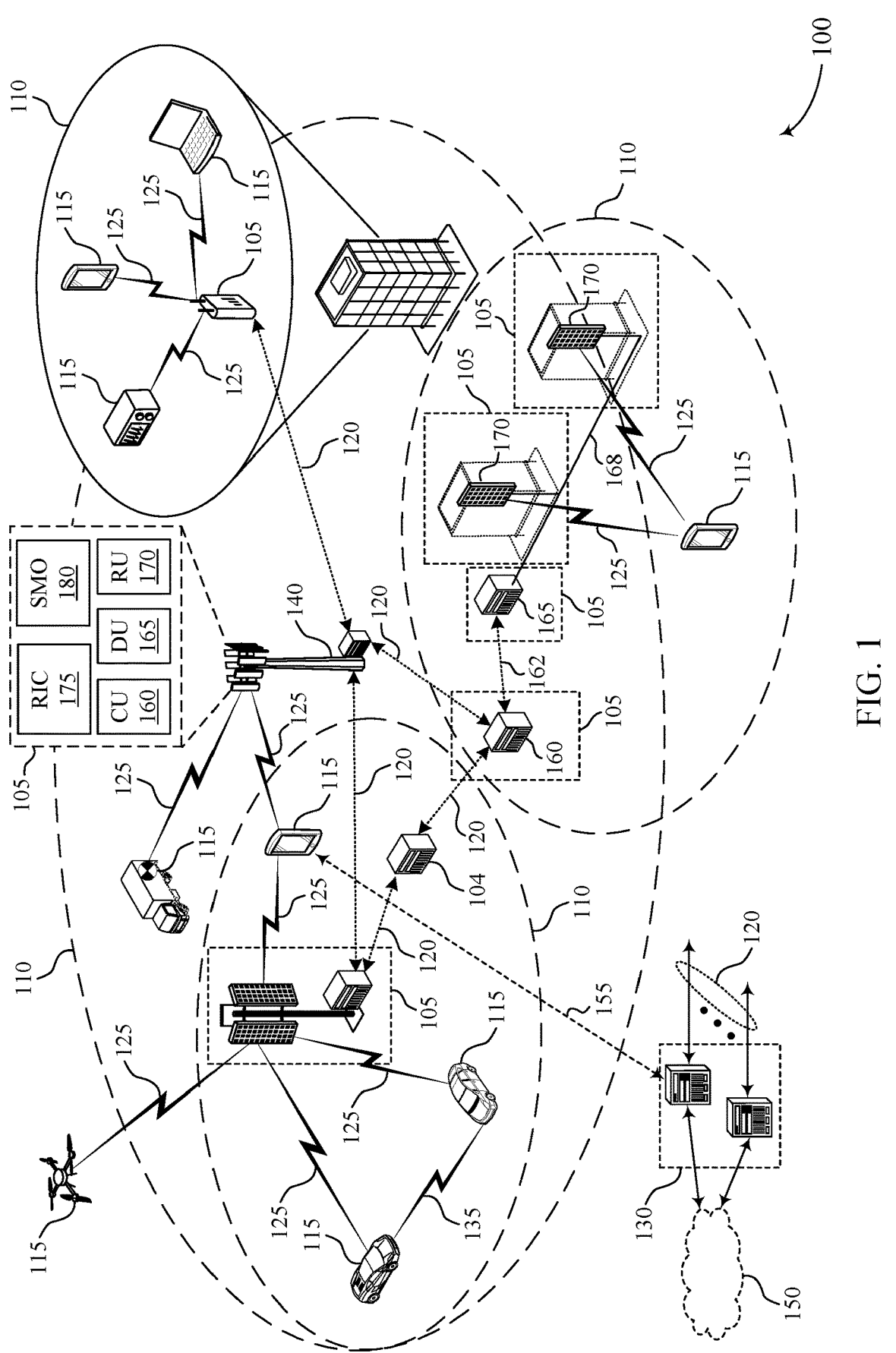
FIG. 1 shows an example of a wireless communications system that supports physical downlink control channel (PDCCH) rate control in accordance with one or more aspects of the present disclosure.

A user equipment (UE) may receive downlink control information (DCI) via a physical downlink control channel (PDCCH), which may schedule a data message via a physical downlink shared channel (PDSCH). In some cases, it may be desirable to tightly integrate (e.g., to support multiplexing of) PDCCH and PDSCH regions, instead of defining them separately. Such tight integration of PDCCH and PDSCH regions may involve a sharing of a PDSCH demodulation reference signal (DMRS) for the PDCCH or a sharing of resources for the PDCCH (e.g., the PDSCH may be rate matched around the resources used by the PDCCH). In some cases, various techniques for PDCCH resource allocation and transmission may be deployed in non-millimeter wave band contexts (e.g., frequency range 1 (FR1)), and such techniques may be adapted to various complexities that are, in some deployments, specific to non-millimeter wave band contexts. For example, in some non-millimeter wave band contexts, PDCCH resources of a control resource set (CORESET) may be monitored by multiple UEs, resulting in various multi-user considerations that may limit feasibility associated with tight integration of PDCCH and PDSCH. Many of such complexities may fall away or decrease in millimeter wave band contexts (e.g., frequency range 2 (FR2), higher millimeter wave frequency ranges), which may enable tighter integration of PDCCH and PDSCH regions for millimeter wave band communications. However, current PDCCH/PDSCH multiplexing designs may suffer from ambiguity relating to how a modulation order and a coding rate are determined, as, prior to PDCCH decoding, the UE may not know a modulation order or a coding rate of the PDSCH.

In accordance with the examples described herein, the UE or the network entity may implement beta-based rate control of the PDCCH to support PDCCH and PDSCH multiplexing. For example, the UE may perform blind decoding (BD) over a PDCCH in accordance with a resource allocation unit (e.g., a smallest unit for PDCCH decoding) that is a function of a payload size and in accordance with a coding rate indicated by a beta parameter. The UE may receive the beta parameter from a network entity, and, in some examples, the beta parameter may effectively be the coding rate difference from a data coding rate (e.g., a coding rate of PDSCH). In some cases, the network entity may indicate a common beta parameter that applies to any DCI format, may indicate that multiple DCI formats may each be associated with a different beta parameter, or may indicate that multiple beta parameters may correspond to a same DCI format. In some examples, the network entity may use the resource allocation unit and the beta parameter to align how many resource elements (REs) are used for each DCI format, along with BD considerations. As described herein, a beta parameter may be equivalently referred to or understood as a coding rate value. As such, the terms "beta parameter" and "coding rate value" may be used interchangeably herein, as both may be indicative of a value that is associated with a coding rate of DCI.

By using beta-based rate control of the PDCCH, the UE may support more efficient utilization of resources and more efficient communications between devices, thereby decreasing latencies. For example, the UE may multiplex (e.g., frequency division multiplex (FDM)) the PDCCH and the PDSCH, which may allow for a same set of resources to be used for both PDCCH and PDSCH transmissions and may decrease latencies associated with the UE receiving DCI or data messages. Beta-based rate control of the PDCCH may also increase a reliability of communications, for example, by allowing for modification of the beta parameter per DCI format to selectively increase the reliability of some DCI formats. Further, beta-based rate control of the PDCCH may support flexibility of communications by supporting multiplexing of DCI formats of varying payload sizes using resource allocation units that relate to (e.g., are a function of) DCI format payload size. In accordance with such lower latency, greater reliability, and greater flexibility, the described techniques may be further implemented to support higher data rates, greater system capacity, and greater spectral efficiency, among other benefits.

Aspects of the disclosure are initially described in the context of wireless communications systems. Aspects of the disclosure are further described in the context of wireless communications systems, BD schemes, and process flows. Aspects of the disclosure are further illustrated by and described with reference to apparatus diagrams, system diagrams, and flowcharts that relate to PDCCH rate control.

FIG. 1 shows an example of a wireless communications system 100 that supports PDCCH rate control in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support PDCCH rate control as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, an RE may refer to resources of one symbol period (e.g., a duration of one modulation symbol) and one subcarrier, in which case the symbol period and subcarrier spacing may be inversely related. The quantity of bits carried by each RE may depend on the modulation scheme (e.g., the order of the modulation scheme, the coding rate of the modulation scheme, or both), such that a relatively higher quantity of REs (e.g., in a transmission duration) and a relatively higher order of a modulation scheme may correspond to a relatively higher rate of communication. A wireless communications resource may refer to any combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, FDM techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some implementations, a UE 115 may receive a control message from a network entity 105 indicating a coding rate value (e.g., a beta parameter) corresponding to a DCI format. The coding rate value may indicate a coding rate of the DCI format. The UE 115 may receive, via a quantity of REs that is based on a payload size and the coding rate value, a DCI message of the DCI format that includes scheduling information associated with a data message, and the UE may receive the data message in accordance with the scheduling information. In some examples, the UE 115 may receive the DCI message via a PDCCH multiplexed with a PDSCH that carries the data message. In some cases, the UE 115 may receive an indication of a coding rate of the data message, and the coding rate value may indicate an offset associated with the coding rate of the data message.

Figure 2:
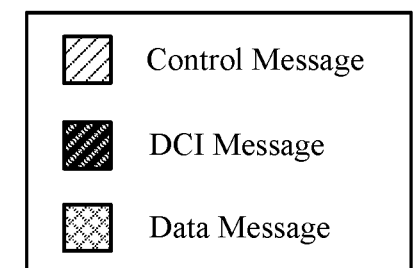
FIG. 2 shows an example of a wireless communications system that supports PDCCH rate control in accordance with one or more aspects of the present disclosure.
Figure 2:
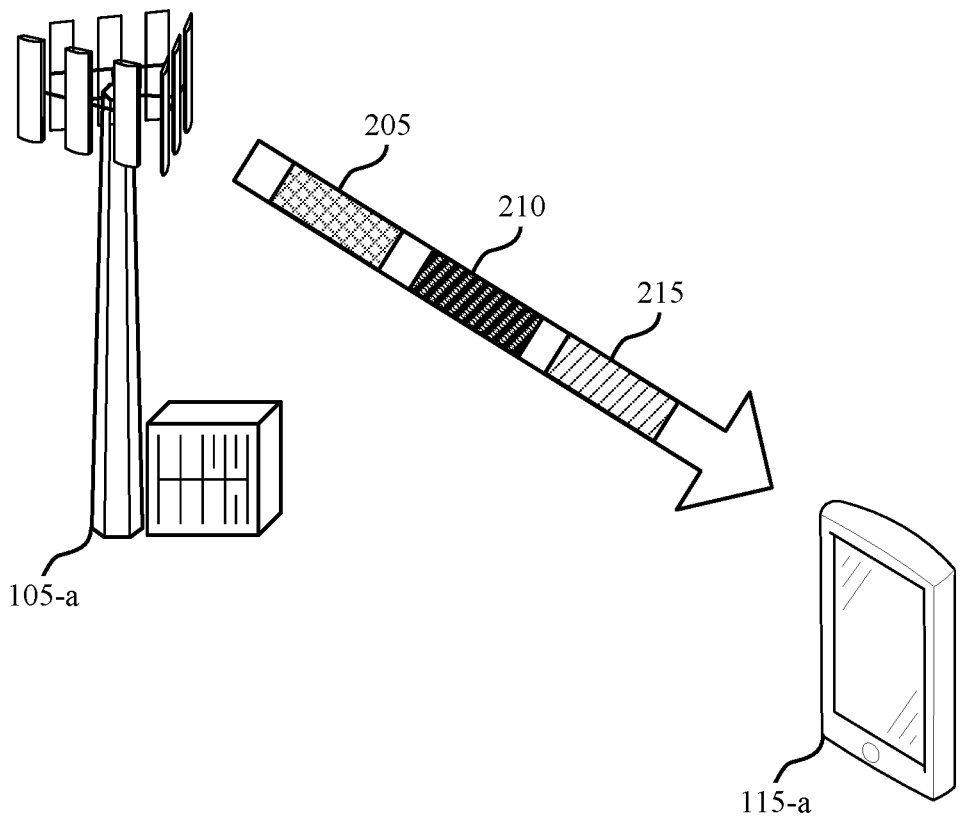

FIG. 2 shows an example of a wireless communications system 200 that supports PDCCH rate control in accordance with one or more aspects of the present disclosure. The wireless communications system 200 may implement or may be implemented by aspects of the wireless communications system 100. For example, the wireless communications system 200 may include a UE 115-a and a network entity 105-a, which may be examples of corresponding devices as described herein with reference to FIG. 1.

The network entity 105-a may transmit a DCI message 210 to the UE 115-a that includes scheduling information for a data message 215. The UE 115-a may receive the DCI message 210 via a PDCCH. In some examples, including examples in which the UE 115-a communicates via an FR1 band, multiple DCI messages targeting multiple UEs 115 may share a collection of resources, which may be referred to as a control resource set (CORESET). Such a design for PDCCH may increase control capacity and flexibility and may enable the network entity 105-a to send DCI messages (e.g., including the DCI message 210) to multiple UEs 115 with different geometry. For example, the network entity 105-a may use different aggregation levels to send the DCI messages to the multiple UEs 115. In some cases, different UEs 115 may have different channel realization, and a demodulation reference signal (DMRS) may be self-contained within each PDCCH to enable the network entity 105-a to separately select precoding for each of the DCI messages for the multiple UEs 115.

In some cases, the network entity 105-a and the UE 115-a may support frequency subbands in different bands. For example, the network entity 105-a and the UE 115-a may support frequency subbands in a millimeter wave band or may be deployed in millimeter wave systems. Examples of millimeter wave bands may include FR2, frequency range 3 (FR3), frequency range 4 (FR4), frequency range (FR5), frequency ranges above FR5, or any combination of these ranges of a radio access technology. In some examples, the network entity 105-a may transmit a PDCCH for communication with the UE 115-a in a millimeter wave system, and design considerations for the PDCCH may differ relative to non-millimeter wave systems (e.g., FR1).

For example, in millimeter wave systems (e.g., FR2), one or both of the network entity 105-a and the UE 115-a may operate (such as communicate, including transmission, reception, or any combination thereof) in accordance with an analog beam restriction. For example, the network entity 105-a may serve multiple different UEs 115, and the network entity 105-a may transmit DCI to each of the UEs 115 via different analog beams (e.g., due to channel traffic). Thus, the multiple UEs 115 may have a low likelihood to be in the same analog beam, and the network entity 105-a may be unable to transmit DCI to each of the UEs 115 using frequency division multiplexing (FDM) (e.g., with a single antenna array) of the PDCCH. Instead, the network entity 105-a may transmit DCI to each of the multiple UEs 115 using time division multiplexing (TDM), or spatial domain multiplexing (SDM) (e.g., if the network entity 105-a has multiple antenna panels), of the PDCCH. A subcarrier spacing (SCS) for millimeter wave systems (e.g., FR2 or higher) may be large, and a symbol or slot duration may be short, relative to non-millimeter wave systems (e.g., FR1).

Accordingly, in millimeter wave systems, serving different UEs 115 with a smaller time unit and in accordance with TDM may still provide an acceptable delay, as a time duration between service of different UEs 115 may be relatively small due to the relatively large SCS.

In some examples, instead of using a PDCCH to transmit DCI for multiple UEs, the network entity 105-a in a millimeter wave system may use a PDCCH to send one or more DCI messages 210 to the same UE 115-a. The network entity 105-a may use a same or similar modulation order, a same or similar precoding, same or similar beamforming, or any combination thereof for multiple DCI messages 210 to be sent to a same UE 115. Further, in accordance with a PDCCH including one or multiple DCI messages 210 intended for the UE 115-a (e.g., a single, same UE 115), the network entity 105-a may use a same or similar precoding (e.g., beamforming) for both the PDCCH carrying the DCI message(s) 210 and a PDSCH carrying the data message 215.

The network entity 105-a may multiplex the PDCCH carrying the DCI message 210 with a PDSCH that carries the data message 215 scheduled by the DCI message 210, and a coding rate for the DCI message 210 may be associated with a coding rate for the data message 215 based on a coding rate value (e.g., an offset). In other words, instead of defining separate PDCCH and PDSCH regions, the network entity 105-a may tightly integrate transmission of the DCI message 210 via the PDCCH and transmission of the data message 215 via the PDSCH. In some examples, such tight integration may be associated with the PDCCH and the PDSCH sharing a DMRS. In such examples, the network entity 105-a may apply a DMRS for the PDSCH to the PDCCH (such that the PDCCH may exclude a DMRS resource and instead rely on a DMRS resource of the PDSCH). Additionally, or alternatively, the PDCCH and the PDSCH may share resources. For example, the network entity 105-a may rate match the PDSCH around the resources used by the PDCCH.

In some examples, the network entity 105-a may use DMRS sharing between the PDCCH and the PDSCH in non-millimeter wave band systems. However, DMRS sharing for non-millimeter wave band systems may be incompatible with higher ranks, or, in some examples, non-millimeter wave systems may prioritize sending DCI to multiple UEs 115, which may be incompatible with DMRS sharing (as different UEs 115 likely have different channel realizations). In some examples, a network entity 105-a may consider tighter ways for PDSCH to rate match around PDCCH, and, in some cases, the network entity 105-a may rate match PDSCH around more than one PDCCH. However, in non-millimeter wave systems, such examples may cause increased control complexity. In some examples, the network entity 105-a may piggyback (e.g., multiplex) the DCI message 210 in the PDSCH. However, to piggyback the DCI message 210, the network entity 105-a may use a standalone DCI or part of a previous DCI message to control or indicate a format of the piggyback portion of the DCI in the PDSCH, which may increase signaling overhead or otherwise increase complexity at the UE 115-a or the network entity 105-a. In some examples, complexities or inefficiencies associated with DMRS sharing or resource sharing between the PDCCH and the PDSCH may fall away or decrease when DMRS sharing, or resource sharing, is deployed in millimeter wave systems.

In some cases, the network entity 105-a may determine a modulation order and coding rate for multiplexing of the PDCCH with the PDSCH. The determination of the modulation and coding rate may be based on similar multiplexing designs for uplink or sidelink communications. For example, for piggybacking (e.g., multiplexing) uplink control information (UCI) in a physical uplink shared channel (PUSCH), a modulation order for the UCI may be the same as, or similar to, that of the PUSCH as indicated in an uplink grant. The uplink grant may include an indication of a beta parameter (e.g., coding rate value) to control a coding rate for the UCI. For sidelink control information (SCI) (e.g., SCI part 2 (SCI-2)) multiplexed with a physical sidelink shared channel (PSSCH), a modulation order for the SCI may be fixed (e.g., to a quadrature phase shifting key (QPSK) modulation scheme) irrespective of a modulation order for the PSSCH. A UE 115 may determine a coding rate for the SCI based on a beta indication in SCI part 1 (SCI-1). Such a multiplexing design (e.g., a determination of modulation scheme and coding rate) for the SCI may be based on a target reliability for SCI-2 being higher than for PSSCH (e.g., a remainder of the PSSCH).

In some examples, the UE 115-a may determine a modulation order for the PDSCH after decoding the PDCCH. The coding rate (e.g., data rate) of the PDCCH may be based on channel variation, similar to PDSCH. However, in some cases, the coding rate of PDCCH may be higher relative to PDSCH to increase reliability. For example, the network entity 105-a may not retransmit the PDCCH, and the UE 115-a may be unable to perform soft combining of the PDCCH, which may decrease reliability of the PDCCH, and the network entity 105-a may increase the coding rate for the PDCCH to compensate for the loss in reliability. In some cases, to increase reliability, the network entity 105-a may use aggregation level control of the PDCCH, which may be implemented by the network entity 105-a and may be transparent to the UE 115-a.

In some cases, the PDCCH rate control may be aggregation level based. A basic unit of resources (e.g., a CCE) may be defined as a smallest assignment unit, and the network entity may code the PDCCH as to not code any DCI smaller than the smallest assignment unit (e.g., no smaller than a single CCE). The UE 115-a may perform BD of the PDCCH for DCI, and the UE 115-a may perform BD of resources of the PDCCH based on the smallest assignment unit for DCI being at least one CCE. The definition of the CCE as the smallest assignment unit may be universal and irrespective of a payload size of the DCI. In some examples, the network entity 105-a may code the PDCCH to occupy multiple CCEs (e.g., based on an aggregation level). The network entity 105-a may aggregate CCEs in groupings of powers of two CCEs to be used for each DCI. For example, the network entity 105-a may indicate an aggregation level (e.g., 0, 1, 2, 3), and the UE 115-a may blind decode groups of CCEs (e.g., 1 CCE, 2 CCEs, 4 CCEs, 9 CCEs) based on the aggregation level.

In some examples, the network entity 105-a may modulate the PDCCH using a modulation order (e.g., QPSK) and a coding rate that is fixed (e.g., fixed across DCI). The network entity 105-a may determine a fixed set of multiple candidate modulation order and coding rate pairs. That is, the network entity 105-a may map each data rate with a respective modulation order. The UE 115-a may perform demodulation based on the fixed modulation order and coding rate pairs in addition to performing BD of the PDCCH based on the CCE, or groups of CCEs based on the aggregation level.

In other examples, the network entity 105-a may modulate the PDCCH using an adjustable modulation order or may code the PDCCH using an adjustable coding rate, or any combination thereof. For example, a coding rate for the PDCCH may be associated with the coding rate for PDSCH. In some examples, the network entity 105-*a* may indicate a beta value (e.g., a coding rate value) for the PDCCH which may be an offset (e.g., a backoff) relative to the coding rate for the PDSCH. In some examples, the network entity 105-*a* may adjust the modulation order, the coding rate, or both for the PDCCH over time. Determining the coding rate for PDCCH based on an aggregation level may have various advantages. For example, the network entity 105-*a* may use channel estimation sharing, log likelihood ratio (LLR) sharing, demodulation sharing, or any combination thereof, between different BD candidates if there is CCE level overlap. In some examples, by using aggregation level based coding rates for PDCCH, the network entity 105-*a* may multiplex multiple DCI of different payload sizes, of different aggregation levels, or for different UEs 115. In such examples, a relatively large CCE is used as a multiplexing unit (e.g., relative to non-multiplexing schemes) which may reduce losses (e.g., data losses) due to partial overlap of the multiple DCI in the PDCCH.

In accordance with examples described herein, the network entity 105-*a* may use beta-based rate control for the PDCCH (and, in association, the tightly integrated PDSCH). For example, the network entity 105-*a* may define a basic resource allocation unit for the PDCCH that is a function of the payload size of the DCI (e.g., payload size of a DCI format of the DCI), and the network entity 105-*a* may use a coding rate for the PDCCH that is based on a beta parameter (e.g., coding rate value). The network entity 105-*a* may indicate one or more beta parameters in a control message 205 that the network entity 105-*a* transmits to the UE 115-*a*. For example, the UE 115-*a* may receive the control message 205 indicating a coding rate value (e.g., a beta parameter) corresponding to a DCI format, and the coding rate value may be indicative of a coding rate of the DCI format. The beta parameter may control the coding rate of the PDCCH, for example, by indicating an offset relative to the coding rate for the PDSCH, and may be similar to the beta parameter for UCI or SCI. By using beta-based rate control, the network entity 105-*a* may support greater resolution in rate control for the PDCCH (e.g., relative to rate control for the PDSCH), as opposed to power of two, or aggregation level based, rate control, which has no association with PDSCH. Accordingly, based on the greater resolution in rate control, the network entity 105 may multiplex the PDCCH and the PDSCH together (e.g., using FDM, TDM, SDM, or any combination thereof). For example, the UE 115-*a* may receive the DCI message 210 via the PDCCH multiplexed with the PDSCH that carries the data message 215.

In some examples, the beta parameter may be associated with a modulation and coding scheme (MCS) that the network entity 105-*a* indicates to the UE 115-*a*. The beta parameter may be fixed, and the coding rate for PDCCH may be adapted together with the coding rate for PDSCH. That is, the beta parameter may indicate an offset (e.g., a backoff, or a coding rate difference) associated with the coding rate for PDSCH, and the coding rate for PDCCH may change proportionally with changes to the coding rate for PDSCH. By associating the beta parameter with the MCS (e.g., with the coding rate for PDSCH), the network entity 105-*a* may eliminate an extra control loop. For example, the network entity 105-*a* may reduce signaling to the UE, thereby reducing power consumption and processing, by associating the coding rate for PDCCH together with the coding rate for PDSCH. In this way, the beta parameter may effectively be the coding rate difference from the data coding rate (e.g., PDSCH coding rate). For example, the UE 115-*a* may receive an indication of a coding rate of the data message 215, and the coding rate value may indicate an offset associated with the coding rate of the data message 215.

Figure 3:
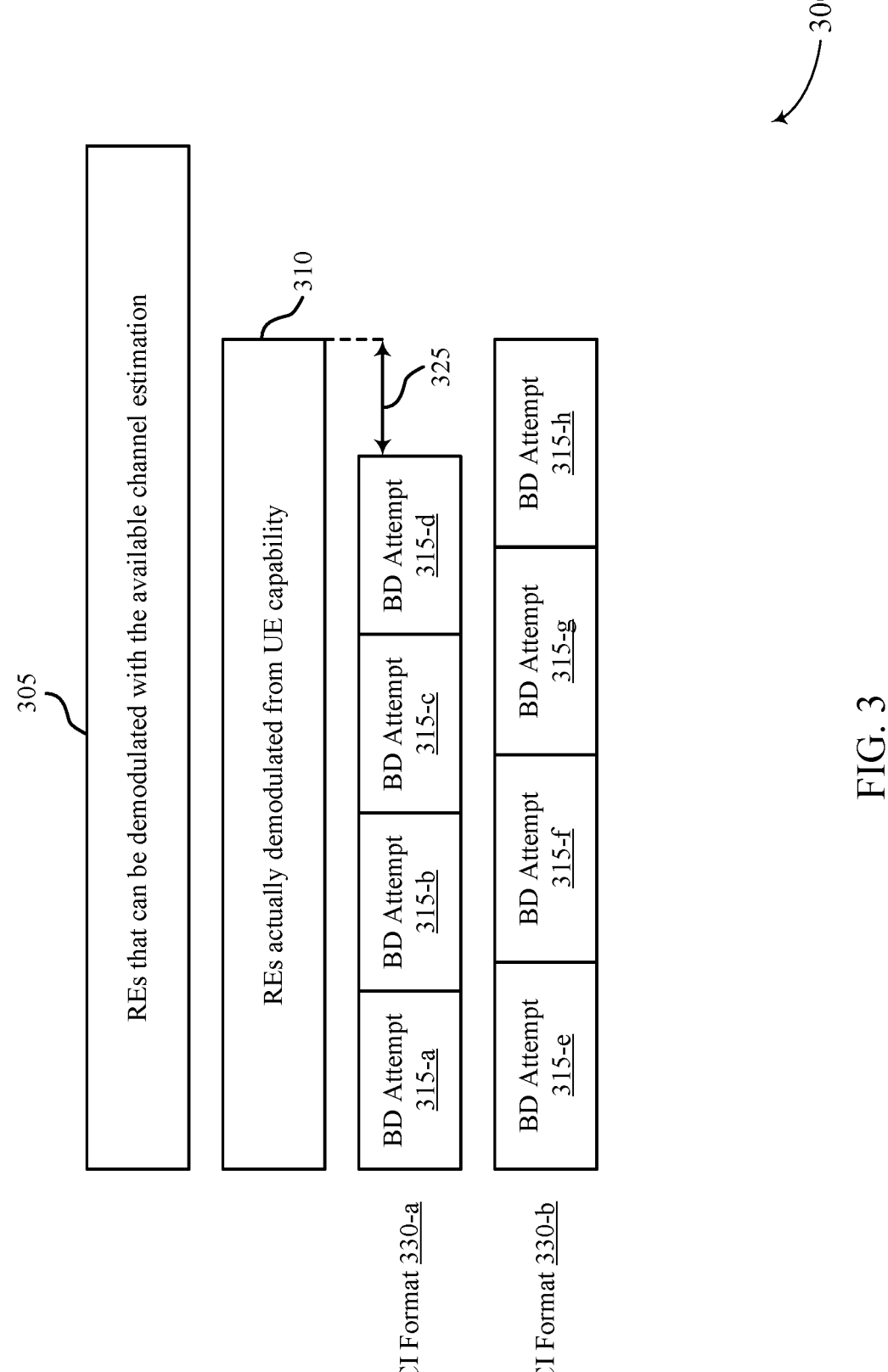
FIGS. 3 through 8 show examples of blind decoding (BD) schemes that support PDCCH rate control in accordance with one or more aspects of the present disclosure.

FIG. 3 shows an example of a BD scheme 300 that supports PDCCH rate control in accordance with one or more aspects of the present disclosure. The BD scheme 300 may implement or may be implemented by aspects of the wireless communications system 100 or the wireless communications system 200. For example, the BD scheme 300 may include BD attempts 315, which may be performed by a UE 115, as described herein with reference to FIGS. 1 and 2.

A network entity 105 may transmit, to the UE 115, a PDCCH that includes one or more DCI messages 210 (described herein with reference to FIG. 2) of one or more DCI formats 330. The one or more DCI messages 210 may be multiplexed together in the PDCCH. A UE 115 that attempts to receive one of the one or more DCI messages 210 may determine an available channel estimation of the PDCCH to determine a quantity of REs 305 that can be demodulated with the available channel estimation. From the quantity of REs 305, the UE 115 may demodulate a set of REs 310 based on a capability of the UE 115. The UE 115 may perform BD attempts 315 of resources from the set of REs 310 to attempt to receive a DCI message 210, and the UE 115 may receive the DCI message 210 upon a successful BD attempt 315. As described herein, a BD attempt 315 may refer to any combination of one or more of a BD attempt 315-*a* through a BD attempt 315-*h*.

Rather than performing each BD attempt 315 over a common unit of REs, such as a CCE, the UE 115 may perform BD attempts 315 using a resource allocation unit of REs that is a function of payload size, coding rate, or any combination thereof. The coding rate that the UE 115 uses to decode the PDCCH may be different for different DCI formats 330, and the network entity 105 may indicate the coding rate to the UE 115 using a beta parameter. The beta parameter may indicate an offset relative to a coding rate for a data message that is scheduled by the DCI (e.g., a coding rate for PDSCH). In some examples, the network entity 105 may indicate the resource allocation unit for PDCCH that is a function of the payload size, the coding rate, or any combination thereof, to the UE 115. The network entity 105 may indicate the coding rate, the resource allocation unit for PDCCH, or both, via RRC signaling, a MAC-control element (MAC-CE), or a previous DCI message.

In some examples, the network entity 105 may indicate a common beta parameter that applies to any DCI format. For example, the UE 115 may receive an indication that a coding rate (e.g., the common beta parameter) corresponds to multiple DCI formats 330. The beta parameter may indicate that the coding rate is the same across DCI formats 330. For DCI of different DCI formats 330 with different payload size that are encoded with a same coding rate (e.g., based on the common beta parameter), different quantities of REs may be allocated for the DCI. For example, a UE 115 may perform a BD attempt 315-*a*, a BD attempt 315-*b*, a BD attempt 315-*c*, and a BD attempt 315-*d* for decoding a DCI message of a DCI format 330-*a* according to the common beta parameter and may perform a BD attempt 315-*e*, a BD attempt 315-*f*, a BD attempt 315-*g*, and a BD attempt 315-*h* for decoding a DCI message of a DCI format 330-*b* according to the same common beta parameter. A payload size for the DCI format 330-*a* may be smaller than a payload size for the DCI format 330-*b*, and a quantity of REs per BD attempt 315 may be fewer for the DCI format 330-*a* compared with a quantity of REs per BD attempt 315 for the DCI format 330-*b* (e.g., based on the payload size for the DCI format 330-*a* being smaller). In some cases, the DCI message of the DCI format 330-*a* may be multiplexed with one or more other DCI messages of one or more other DCI formats 330 (e.g., the DCI format 330-*a* and the DCI format 330-*b* may be multiplexed together), or the DCI message may be multiplexed with a PDSCH that carries a data message scheduled by the DCI message.

The UE 115 may perform the BD attempts 315 on any resources that are within the set of REs 310 that the UE 115 has demodulated. With the payload size differing between different DCI formats 330 (e.g., the DCI format 330-*a*, the DCI format 330-*b*), the UE 115 may assign different subsets of REs of the set of REs 310 for different DCI hypotheses (e.g., BD attempts 315). That is, the UE 115 may perform the BD attempt 315-*a* for the DCI format 330-*a* using a first subset of REs and may perform the BD attempt 315-*e* for the DCI format 330-*b* using a second subset of REs different from the first subset of REs. The BD attempt 315-*a* may use a fewer quantity of REs than the BD attempt 315-*e*. In some examples, the UE 115 may compute an LLR for performing the BD attempts 315, and the LLR may be shared across BD attempts 315 for DCI messages of different formats. For example, the UE 115 may use a computed LLR for performing the BD attempt 315-*a*, the BD attempt 315-*b*, the BD attempt 315-*c*, and the BD attempt 315-*d* for the DCI format 330-*a* and may reuse the same LLR for performing the BD attempt 315-*e*, the BD attempt 315-*f*, the BD attempt 315-*g*, and the BD attempt 315-*h* for the DCI format 330-*b*.

In some cases, because the DCI formats 330 of different payload sizes may be multiplexed together using the common beta parameter, there may be a packing inefficiency 325. For example, the BD attempt 315-*e*, the BD attempt 315-*f*, the BD attempt 315-*g*, and the BD attempt 315-*h* for decoding the DCI format 330-*b* may use sets of REs that together occupy the entire set of REs 310. However, because the DCI format 330-*a* may be associated with a smaller payload size than the payload size for the DCI format 330-*b*, the BD attempt 315-*a*, the BD attempt 315-*b*, the BD attempt 315-*c*, and the BD attempt 315-*d* may each use smaller sets of REs, and there may be a leftover quantity of REs (e.g., the packing inefficiency 325) of the set of REs 310 not used by the UE 115 to decode a DCI message of the DCI format 330-*a*.

Figure 4:
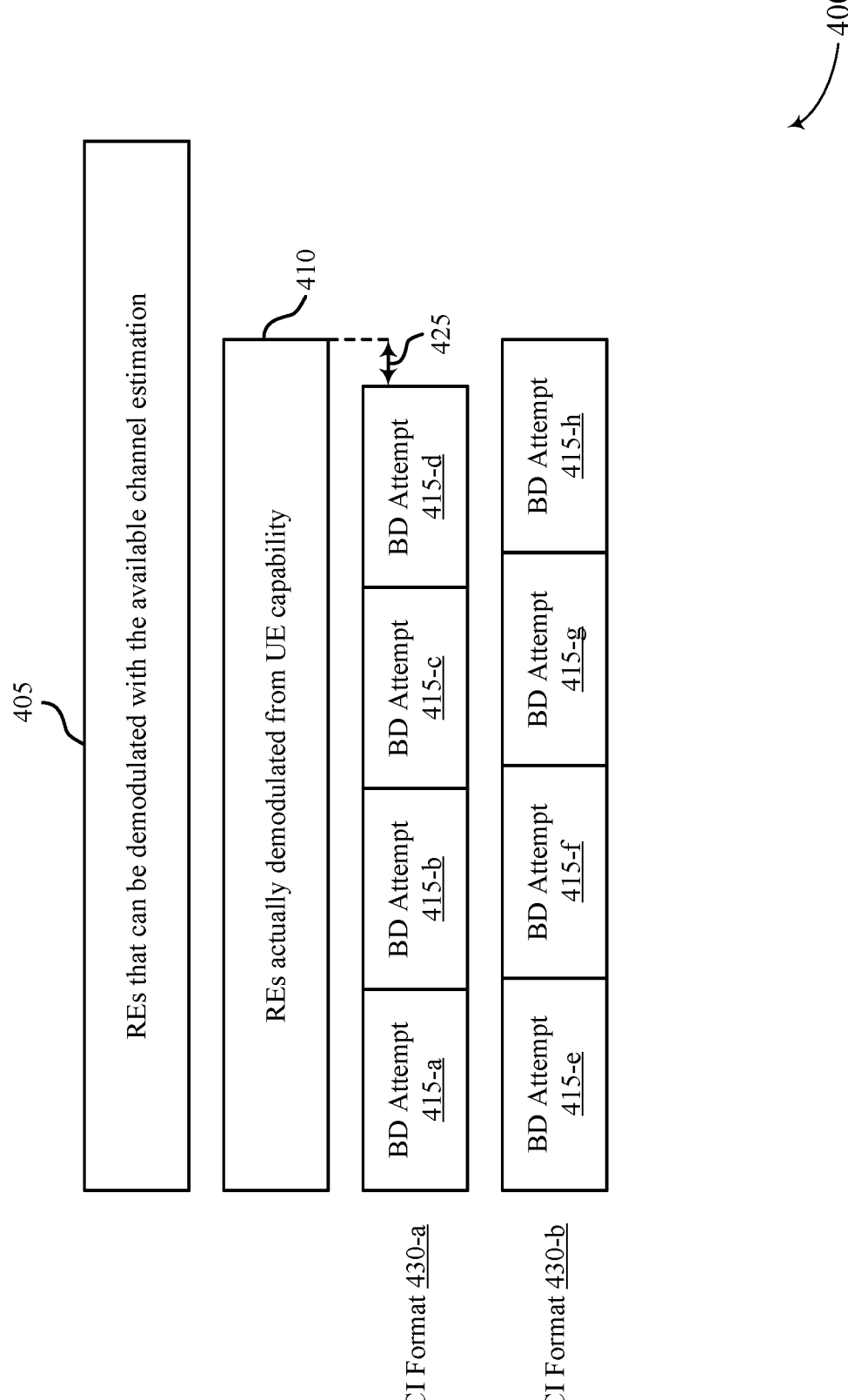

FIG. 4 shows an example of a BD scheme 400 that supports PDCCH rate control in accordance with one or more aspects of the present disclosure. The BD scheme 400 may implement or may be implemented by aspects of the wireless communications system 100 or the wireless communications system 200. For example, the BD scheme 400 may include BD attempts 415, which may be performed by a UE 115, as described herein with reference to FIGS. 1 and 2.

A network entity 105 may transmit, to the UE 115, a PDCCH that includes one or more DCI messages 210 (described herein with reference to FIG. 2) of one or more DCI formats 430. The one or more DCI messages 210 may be multiplexed together in the PDCCH. A UE 115 that attempts to receive one of the one or more DCI messages 210 may determine an available channel estimation of the PDCCH to determine a quantity of REs 405 that can be demodulated with the available channel estimation. From the quantity of REs 405, the UE 115 may demodulate a set of REs 410 based on a capability of the UE 115. The UE 115 may perform BD attempts 415 of resources from the set of REs 410 to attempt to receive a DCI message 210, and the UE 115 may receive the DCI message 210 upon a successful BD attempt 415. As described herein, a BD attempt 415 may refer to any combination of one or more of a BD attempt 415-*a* through a BD attempt 415-*h*.

Rather than performing each BD attempt 415 over a common unit of REs, such as a CCE, the UE 115 may perform BD attempts 415 using a resource allocation unit of REs that is a function of payload size, coding rate, or any combination thereof. The coding rate that the UE 115 uses to decode the PDCCH may be different for different DCI formats 430, and the network entity 105 may indicate the coding rate to the UE 115 using a beta parameter. The beta parameter may indicate an offset relative to a coding rate for a data message that is scheduled by the DCI (e.g., a coding rate for PDSCH). In some examples, the network entity 105 may indicate the resource allocation unit for PDCCH that is a function of the payload size, the coding rate, or any combination thereof, to the UE 115. The network entity 105 may indicate the coding rate, the resource allocation unit for PDCCH, or both, via RRC signaling, a MAC-CE, or a previous DCI message.

In some examples, the network entity 105 may indicate a beta parameter per DCI format. For example, the UE 115 may receive indications of multiple coding rate values, and each of the coding rate values may correspond to a respective DCI format of multiple DCI formats 430 (e.g., a DCI format 430-*a*, a DCI format 430-*b*). The indications of the coding rate values, each corresponding to a respective DCI format, may be RRC configured, may be updated by a MAC-CE, or may be indicated by a DCI message (e.g., a previous DCI message).

For example, the UE 115 may perform a BD attempt 415-*a*, a BD attempt 415-*b*, a BD attempt 415-*c*, and a BD attempt 415-*d* for a DCI message of the DCI format 430-*a* based on a first beta parameter corresponding to the DCI format 430-*a* and may perform a BD attempt 415-*e*, a BD attempt 415-*f*, a BD attempt 415-*g*, and a BD attempt 415-*h* for a DCI message of the DCI format 430-*b* based on a second beta parameter corresponding to the DCI format 430-*b*, which may be different from the first beta parameter. Using different beta parameters for respective DCI formats 430 may enable the network entity 105 to modify reliability (e.g., increase reliability to meet a reliability threshold) for different DCI formats 430. In some cases, the DCI message of the DCI format 430-*a* may be multiplexed with one or more other DCI messages of one or more other DCI formats 430 (e.g., the DCI format 430-*a* and the DCI format 430-*b* may be multiplexed together).

In some cases, because the multiple DCI formats 430 of different payload sizes may be multiplexed together, there may be a packing inefficiency 425, despite the use of different beta parameters for respective DCI formats 430. For example, the BD attempt 415-*e*, the BD attempt 415-*f*, the BD attempt 415-*g*, and the BD attempt 415-*h* for decoding the DCI format 330-*b* may use sets of REs that together occupy the entire set of REs 410. However, because the DCI format 430-*a* may be associated with a smaller payload size than the payload size for the DCI format 430-*b*, the BD attempt 415-*a*, the BD attempt 415-*b*, the BD attempt 415-*c*, and the BD attempt 415-*d* may each use smaller sets of REs, and there may be a leftover quantity of REs (e.g., the packing inefficiency 425) of the set of REs 410 not used by the UE 115 to decode a DCI message of the DCI format 430-*a*. In some examples, because the network entity 105 configures the beta parameter (e.g., coding rate value) per DCI format, the packing inefficiency 425 may be smaller relative to the packing inefficiency 325, as described herein with reference to FIG. 3.

Figure 5:
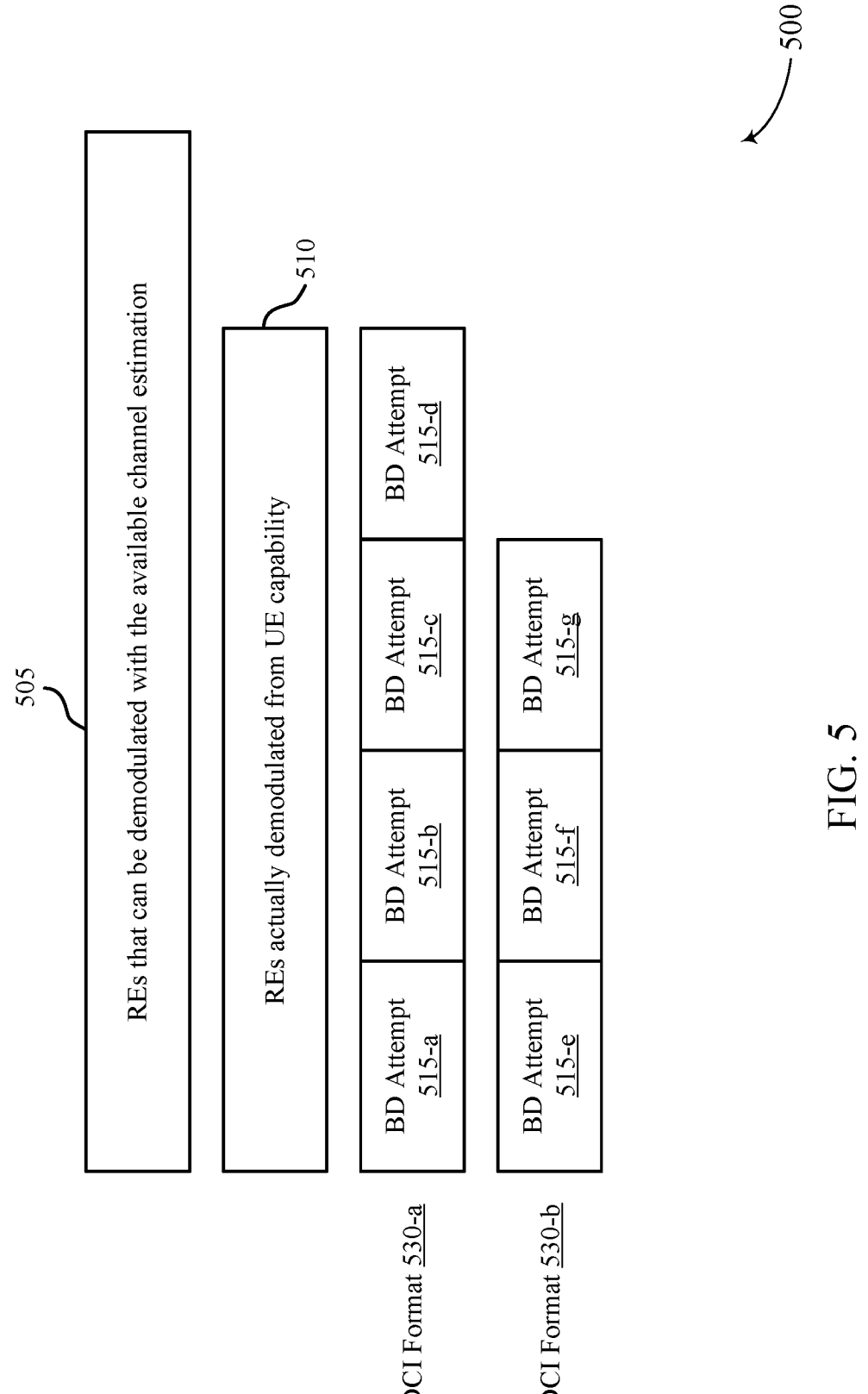

FIG. 5 shows an example of a BD scheme 500 that supports PDCCH rate control in accordance with one or more aspects of the present disclosure. The BD scheme 500 may implement or may be implemented by aspects of the wireless communications system 100 or the wireless communications system 200. For example, the BD scheme 500 may include BD attempts 515, which may be performed by a UE 115, as described herein with reference to FIGS. 1 and 2.

A network entity 105 may transmit, to the UE 115, a PDCCH that includes one or more DCI messages 210 (described herein with reference to FIG. 2) of one or more DCI formats 530. The one or more DCI messages 210 may be multiplexed together in the PDCCH. A UE 115 that attempts to receive one of the one or more DCI messages 210 may determine an available channel estimation of the PDCCH to determine a quantity of REs 505 that can be demodulated with the available channel estimation. From the quantity of REs 505, the UE 115 may demodulate a set of REs 510 based on a capability of the UE 115. The UE 115 may perform BD attempts 515 of resources from the set of REs 510 to attempt to receive a DCI message 210, and the UE 115 may receive the DCI message 210 upon a successful BD attempt 515. As described herein, a BD attempt 515 may refer to any combination of one or more of a BD attempt 515-a through a BD attempt 515-g.

Rather than performing each BD attempt 515 over a common unit of REs, such as a CCE, the UE 115 may perform BD attempts 515 using a resource allocation unit of REs that is a function of payload size, coding rate, or any combination thereof. The coding rate that the UE 115 uses to decode the PDCCH may be different for different DCI formats 530, and the network entity 105 may indicate the coding rate to the UE 115 using a beta parameter. The beta parameter may indicate an offset relative to a coding rate for a data message that is scheduled by the DCI (e.g., a coding rate for PDSCH). In some examples, the network entity 105 may indicate the resource allocation unit for PDCCH that is a function of the payload size, the coding rate, or any combination thereof, to the UE 115. The network entity 105 may indicate the coding rate, the resource allocation unit for PDCCH, or both, via RRC signaling, a MAC-CE, or a previous DCI message.

In some examples, the network entity 105 may use the beta parameter to align the quantity of REs for each DCI format. Accordingly, the UE 115 may perform BD on different DCI formats 530, and the BD attempts 515 of the different DCI formats 530 may be over a same set of REs irrespective of DCI format. To achieve the RE alignment, the network entity 105 may configure a DCI format with a relatively larger payload with a relatively higher coding rate. DCI messages of different DCI formats 530 may be multiplexed together in the PDCCH, and the RE alignment may support improved multiplexing, for example, by supporting multiplexing of greater reliability, accuracy, or efficiency, among other benefits.

The UE 115 may perform a BD attempt 515-a, a BD attempt 515-b, a BD attempt 515-c, and a BD attempt 515-d for a DCI message of a DCI format 430-a and may perform a BD attempt 515-e, a BD attempt 515-f, and a BD attempt 515-g for a DCI message of a DCI format 430-b. Based on the network entity 105 encoding the DCI or different DCI formats 530 with RE alignment, each of the BD attempts 515 for the DCI format 530-a and for the DCI format 530-b may be over a same quantity of REs (e.g., with no packing inefficiency).

In an example, to align REs for BD of the DCI format 530-a and the DCI format 530-b, the network entity 105 may indicate a first beta parameter (e.g., coding rate value) corresponding to the DCI format 530-a and may indicate a second beta parameter corresponding to the DCI format 530-b. In some examples, the first beta parameter may indicate a higher coding rate compared to a coding rate indicated by the second beta parameter based on the DCI format 530-a having a larger payload size than a payload size of the DCI format 530-b. In some other examples, the first beta parameter may indicate a lower coding rate compared to the coding rate indicated by the second beta parameter based on the DCI format 530-a having a smaller payload size than a payload size of the DCI format 530-b.

In some cases, the network entity 105 may align REs for BD of different DCI formats 530 based on a DCI format with a largest payload relative to other DCI formats 530 or based on a DCI format with a smallest payload relative to other DCI formats 530. For example, the UE 115 may select a quantity of REs for receiving a DCI message 210 (e.g., for performing BD attempts 515) of the DCI format 530-a and the UE 115 may select the quantity of REs via which the DCI message 210 is received based on a second quantity of REs associated with the DCI format 530-b with a largest (e.g., or smallest) payload size relative to other DCI formats. The quantity of REs for receiving the DCI message 210 of the DCI format 530-a may equal the second quantity of REs.

In some examples, the network entity 105 may configure a common beta parameter across multiple DCI formats 530, as described in greater detail with reference to FIG. 3. Using the common beta parameter, the network entity 105 may calculate a quantity of REs for each of the multiple DCI formats 530 based on a respective payload size and the common beta parameter. Based on performing the calculations, the network entity 105 may encode DCI messages of any DCI format (e.g., the DCI format 530-a, the DCI format 530-b) using a quantity of REs calculated for the DCI format with the largest or smallest payload. In an example, the UE 115 may calculate a first quantity of REs associated with the DCI format 530-a based on a payload size of the DCI format 530-a and the common beta parameter and may calculate a second quantity of REs associated with the DCI format 530-b based on a payload size of the DCI format 530-b and the common beta parameter. The UE may perform BD attempts 515 for the DCI format 530-a and for the DCI format 530-b using the first quantity of REs based on the DCI format 530-a having the largest (e.g., or smallest) payload relative to other DCI formats 530 (e.g., relative to the DCI format 530-b).

In some other examples, the network entity 105 may configure a beta parameter per DCI format, as described in greater detail with reference to FIG. 4. Using the per DCI beta parameters, the network entity 105 may calculate a quantity of REs for each of the multiple DCI formats 530 based on a respective payload size and a respective beta parameter (e.g., a per DCI beta parameter). Based on performing the calculations, the network entity 105 may encode DCI messages of any DCI format (e.g., the DCI format 530-a, the DCI format 530-b) using a quantity of REs calculated for the DCI format with the largest or smallest payload. In an example, the UE 115 may calculate a first quantity of REs associated with the DCI format 530-a based on a payload size of the DCI format 530-a and a first beta parameter corresponding to the DCI format 530-a and may calculate a second quantity of REs associated with the DCI format 530-b based on a payload size of the DCI format 530-b and a second beta parameter corresponding to the DCI format 530-b. The UE may perform BD attempts 515 for the DCI format 530-a and for the DCI format 530-b using the first quantity of REs based on the DCI format 530-a having the largest (e.g., or smallest) payload relative to other DCI formats 530 (e.g., relative to the DCI format 530-b).

Figure 6:
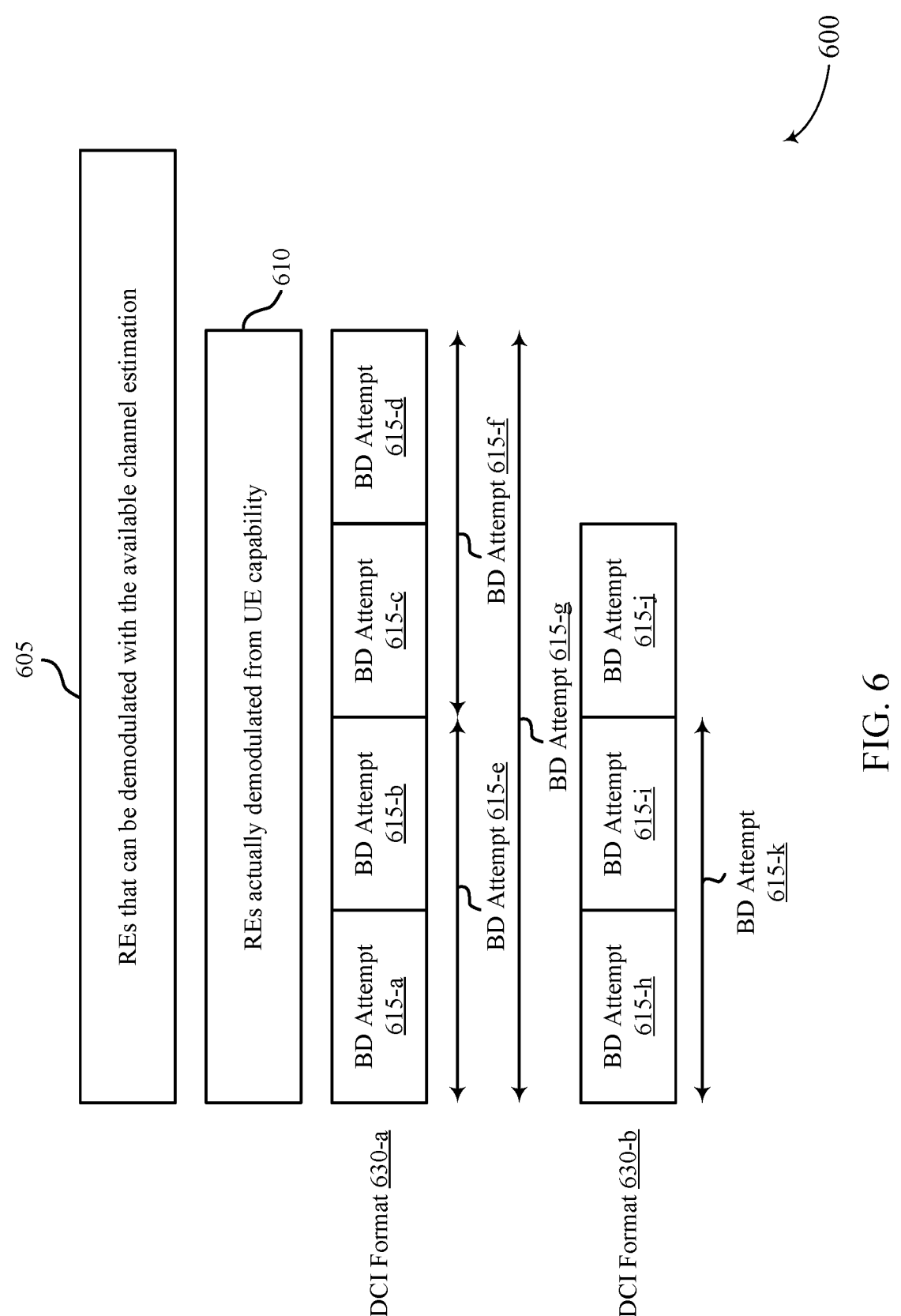

FIG. 6 shows an example of a BD scheme 600 that supports PDCCH rate control in accordance with one or more aspects of the present disclosure. The BD scheme 600 may implement or may be implemented by aspects of the wireless communications system 100 or the wireless communications system 200. For example, the BD scheme 600 may include BD attempts 615, which may be performed by a UE 115, as described herein with reference to FIGS. 1 and 2.

A network entity 105 may transmit, to the UE 115, a PDCCH that includes one or more DCI messages 210 (described herein with reference to FIG. 2) of one or more DCI formats 630. The one or more DCI messages 210 may be multiplexed together in the PDCCH. A UE 115 that attempts to receive one of the one or more DCI messages 210 may determine an available channel estimation of the PDCCH to determine a quantity of REs 605 that can be demodulated with the available channel estimation. From the quantity of REs 605, the UE 115 may demodulate a set of REs 610 based on a capability of the UE 115. The UE 115 may perform BD attempts 615 of resources from the set of REs 610 to attempt to receive a DCI message 210, and the UE 115 may receive the DCI message 210 upon a successful BD attempt 615. As described herein, a BD attempt 615 may refer to any combination of one or more of a BD attempt 615-a through a BD attempt 615-j.

Rather than performing each BD attempt 615 over a common unit of REs, such as a CCE, the UE 115 may perform BD attempts 615 using a resource allocation unit of REs that is a function of payload size, coding rate, or any combination thereof. The coding rate that the UE 115 uses to decode the PDCCH may be different for different DCI formats 630, and the network entity 105 may indicate the coding rate to the UE 115 using a beta parameter. The beta parameter may indicate an offset relative to a coding rate for a data message that is scheduled by the DCI (e.g., a coding rate for PDSCH). In some examples, the network entity 105 may indicate the resource allocation unit for PDCCH that is a function of the payload size, the coding rate, or any combination thereof, to the UE 115. The network entity 105 may indicate the coding rate, the resource allocation unit for PDCCH, or both, via RRC signaling, a MAC-CE, or a previous DCI message.

In some examples, the UE 115 may perform BD attempts 615 in accordance with aggregation levels. However, the aggregation levels may indicate or be associated with (e.g., be an aggregation of) a quantity of resource allocation units that are a function of payload size or coding rate rather than a quantity of CCEs. In some cases, the aggregation levels may indicate quantities of resource allocation units that are powers of two. For example, the UE 115 may perform BD attempts 615 for a DCI message 210 of the DCI format 630-a using one or more aggregation levels. The UE 115 may perform a first set of one or more BD attempts, including a BD attempt 615-a, a BD attempt 615-b, a BD attempt 615-c, and a BD attempt 615-d, each using one resource allocation unit (e.g., an RE set) based on an aggregation level of zero (e.g., $2^0=1$). The UE 115 may perform a BD attempt 615-e and a BD attempt 615-f, each using two resource allocation units (e.g., a second RE set) based on an aggregation level of 1 (e.g., $2^1=2$). The UE 115 may perform a BD attempt 615-g that uses four resource allocation units (e.g., a third RE set) based on an aggregation level of 2 (e.g., $2^2=4$). As such, a quantity of REs via which the DCI message 210 of the DCI format 630-a is received may be based on which aggregation level the UE 115 uses.

Similarly, the UE 115 may perform BD attempts 615 for a DCI message 210 of the DCI format 630-b using aggregation levels. The UE 115 may perform a BD attempt 615-h, a BD attempt 615-i, and a BD attempt 615-j, each using a first RE set associated with a first aggregation level (e.g., one resource allocation unit) and may perform a BD attempt 615-k that uses a second RE set associated with a second aggregation level (e.g., two resource allocation units). Each of the first RE set and the second RE set may at least partially span the set of REs 610 (e.g., may be subsets of the set of REs 610). A quantity of REs via which the DCI message 210 of the DCI format 630-b is received may be based on the first aggregation level or the second aggregation level.

The aggregation levels for different DCI formats 630 may correspond to different quantities of REs based on the resource allocation unit being different for different DCI formats 630 of different payload size. The network entity 105 may indicate an aggregation level to the UE 115 that the network entity uses to encode a DCI message of a PDCCH, and the UE 115 may perform BD of the PDCCH for the DCI message based on the indicated aggregation level. Additionally, or alternatively, a UE 115 may perform BD attempts 615 in accordance with an aggregation level capability of the UE 115, a BD capability of the UE 115, or any combination thereof. In some examples, using aggregation levels for encoding the DCI message may increase reliability, and the network entity 105 may use one or more aggregation levels to satisfy a reliability threshold for a DCI message 210.

Figure 7:
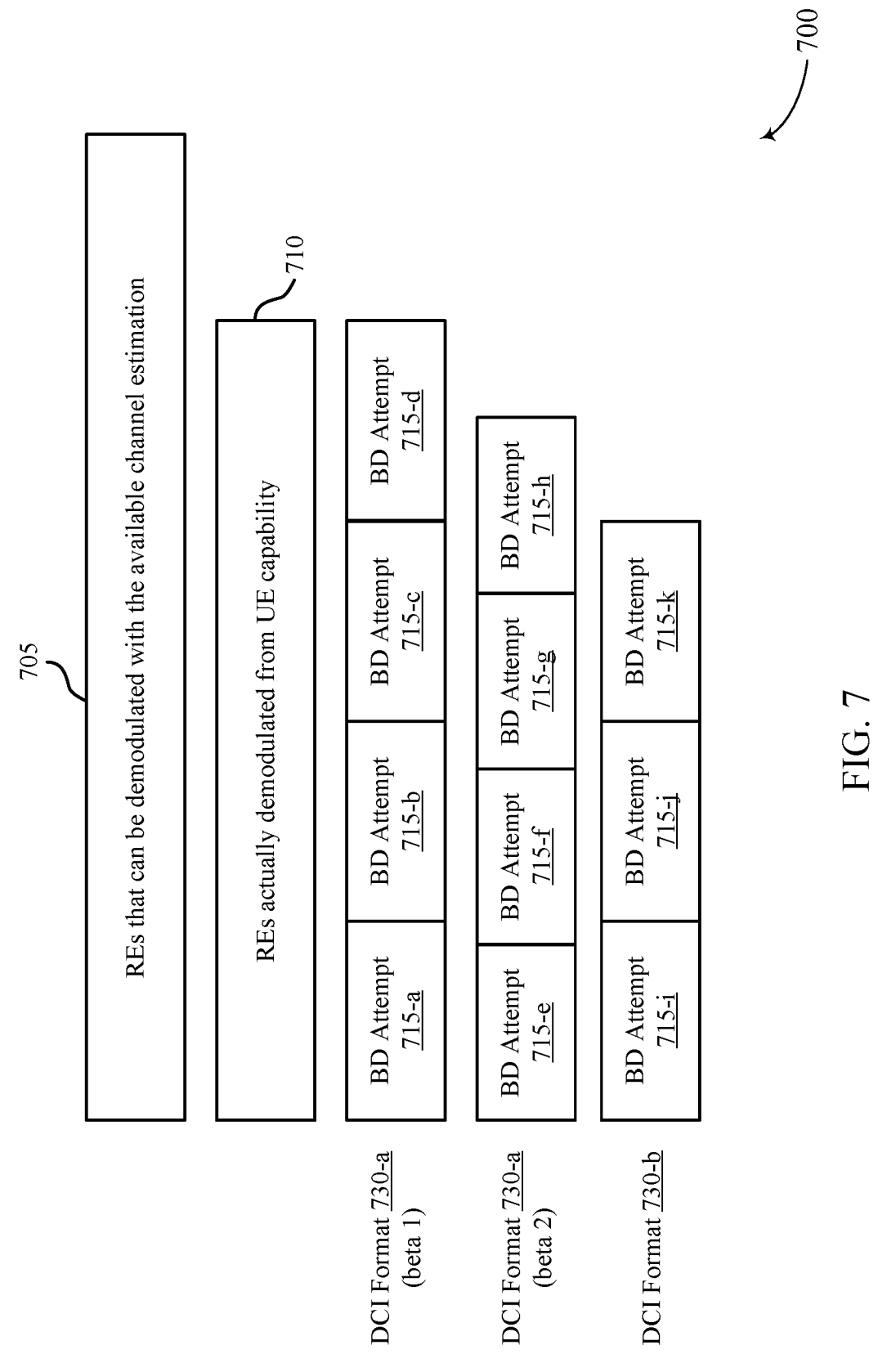

FIG. 7 shows an example of a BD scheme 700 that supports PDCCH rate control in accordance with one or more aspects of the present disclosure. The BD scheme 700 may implement or may be implemented by aspects of the wireless communications system 100 or the wireless communications system 200. For example, the BD scheme 700 may include BD attempts 715, which may be performed by a UE 115, as described herein with reference to FIGS. 1 and 2.

A network entity 105 may transmit, to the UE 115, a PDCCH that includes one or more DCI messages 210 (described herein with reference to FIG. 2) of different DCI formats 730. The one or more DCI messages 210 may be multiplexed together in the PDCCH. A UE 115 that attempts to receive one of the one or more DCI messages 210 may determine an available channel estimation of the PDCCH to determine a quantity of REs 705 that can be demodulated with the available channel estimation. From the quantity of REs 705, the UE 115 may demodulate a set of REs 710 based on a capability of the UE 115. The UE 115 may perform BD attempts 715 of resources from the set of REs 710 to attempt to receive a DCI message 210, and the UE 115 may receive the DCI message 210 upon a successful BD attempt 715. As described herein, a BD attempt 715 may refer to any combination of one or more of a BD attempt 715-a through a BD attempt 715-k.

Rather than performing each BD attempt 715 over a common unit of REs, such as a CCE, the UE 115 may perform BD attempts 715 using a resource allocation unit of REs that is a function of payload size, coding rate, or any combination thereof. The coding rate that the UE 115 uses to decode the PDCCH may be different for different DCI formats 730, and the network entity 105 may indicate the coding rate to the UE 115 using a beta parameter. The beta parameter may indicate an offset relative to a coding rate for a data message that is scheduled by the DCI (e.g., a coding rate for PDSCH). In some examples, the network entity 105 may indicate the resource allocation unit for PDCCH that is a function of the payload size, the coding rate, or any combination thereof, to the UE 115. The network entity 105 may indicate the coding rate, the resource allocation unit for PDCCH, or both, via RRC signaling, a MAC-CE, or a previous DCI message.

In some examples, the network entity 105 may configure multiple beta parameters for a same DCI format 730. The network entity 105 may configure multiple common beta parameters that are applicable across DCI formats 730, or the network entity 105 may configure multiple beta parameters per DCI format 730. In some cases, the network entity 105 may configure some DCI formats 730 with a single beta parameter and may configure other DCI formats 730 with multiple beta parameters. For example, a DCI format 730-a may correspond to a first beta parameter (e.g., beta 1) and a second beta parameter (e.g., beta 2), while the DCI format 730-b may correspond to a single beta parameter. The UE 115 may receive an indication that both the first beta parameter and the second beta parameter correspond to the DCI format 730-a. The first beta parameter and the second beta parameter may be indicative of a first coding rate and a second coding rate, respectively, of the DCI format 730-a. Similarly, the UE 115 may receive an indication that the single beta parameter corresponds to the DCI format 730-b.

The UE 115 performing BD for a DCI message of the DCI format 730-a with multiple beta parameters may attempt to decode the DCI message using multiple different beta hypotheses. For example, the UE 115 may perform a BD attempt 715-a, a BD attempt 715-b, a BD attempt 715-c, and a BD attempt 715-d for the DCI format 730-a based on the first coding rate indicated by (or otherwise associated with) the first beta parameter. The UE 115 may, if previous BD attempts 715 are unsuccessful, also perform a BD attempt 715-e, a BD attempt 715-f, a BD attempt 715-g, and a BD attempt 715-h for the DCI format 730-a based on the second coding rate indicated by (or otherwise associated with) the second beta parameter. The DCI format 730-b may correspond to a single beta parameter, and the UE 115 may perform a BD attempt 715-i, a BD attempt 715-j, and a BD attempt 715-k based on a coding rate indicated by (or otherwise associated with) the single beta parameter. Performing BD for a DCI format using multiple beta parameters may use a greater quantity of a BD budget or capability of the UE 115 because the UE 115 may perform a greater quantity of BD attempts 715 compared with a quantity of BD attempts 715 for a single beta hypothesis per DCI format. Performing BD for multiple beta hypotheses may increase power consumption or processing at the UE 115, while increasing reliability or accuracy of the decoded DCI message.

As such, in some implementations, the network entity 105 or the UE 115, or both, may balance whether to use multiple beta parameters for a given DCI format 730 in accordance with the tradeoff between lower power consumption and greater reliability. In some aspects, the UE 115 and the network entity 105 may exchange one or more messages (e.g., capability messages) via which the UE 115 may indicate whether the UE 115 is capable of multiple beta parameters per DCI format 730. In some aspects, a same DCI format with two different beta parameters may, for the purposes of BD attempts 715 at the UE 115, be understood as two different DCI formats.

Figure 8:
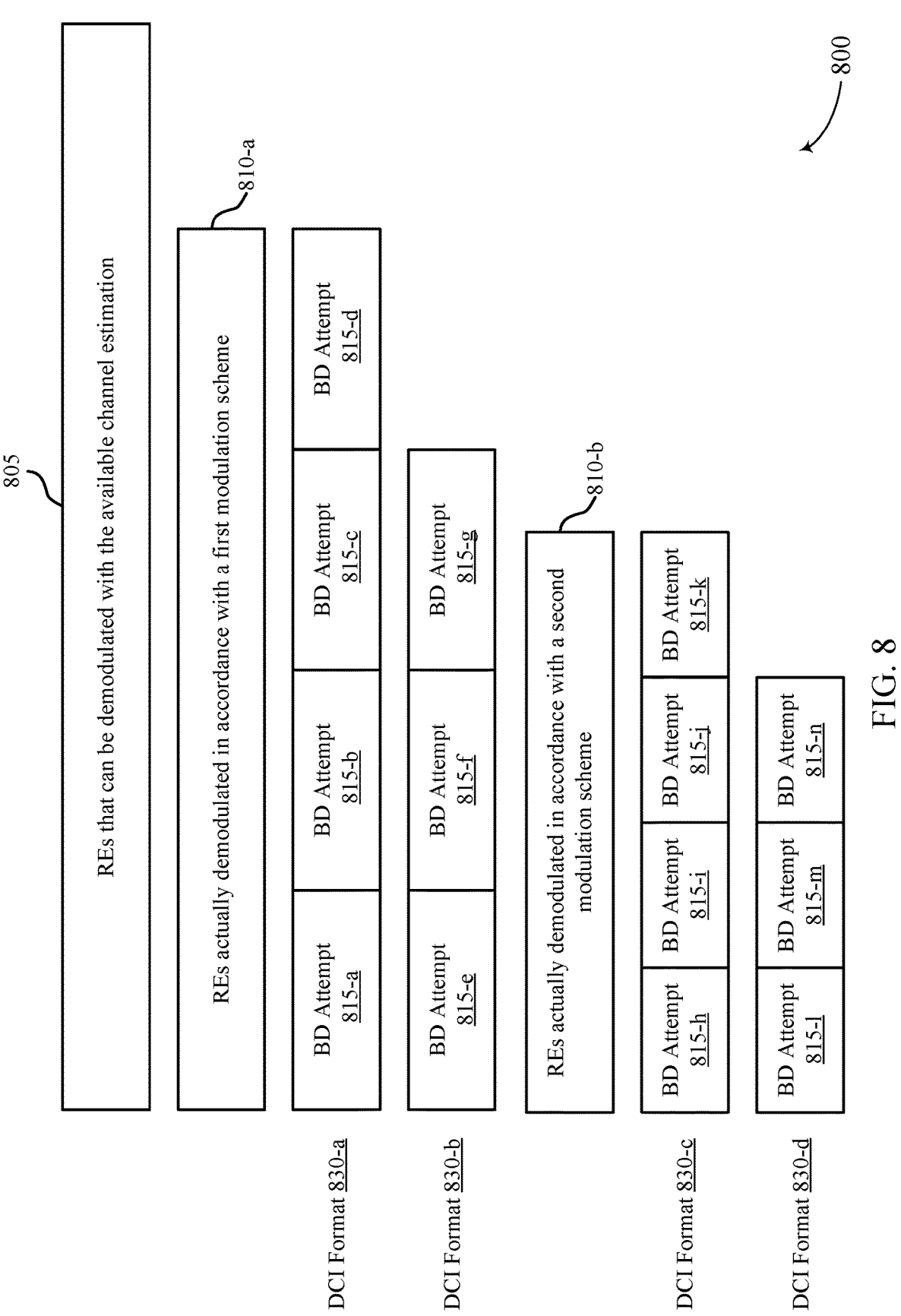

FIG. 8 shows an example of a BD scheme 800 that supports PDCCH rate control in accordance with one or more aspects of the present disclosure. The BD scheme 800 may implement or may be implemented by aspects of the wireless communications system 100 or the wireless communications system 200. For example, the BD scheme 800 may include BD attempts 815, which may be performed by a UE 115, as described herein with reference to FIGS. 1 and 2.

A network entity 105 may transmit, to the UE 115, a PDCCH that includes one or more DCI messages 210 (described herein with reference to FIG. 2) of one or more DCI formats 830. The one or more DCI messages 210 may be multiplexed together in the PDCCH. A UE 115 that attempts to receive one of the one or more DCI messages 210 may determine an available channel estimation of the PDCCH to determine a quantity of REs 805 that can be demodulated with the available channel estimation. From the quantity of REs 805, the UE 115 may demodulate a set of REs 810-a in accordance with a first modulation order (e.g., QPSK), may demodulate a set of REs 810-b in accordance with a second modulation order (e.g., 16-quadrature modulation (QAM)), or may demodulate both the set of REs 810-a in accordance with the first modulation order (e.g., a first modulation scheme) and the set of REs 810-b in accordance with the second modulation order (e.g., a second modulation scheme). The UE 115 may perform BD attempts 815 of resources from the set of REs 810-a or the set of REs 810-b to attempt to receive a DCI message 210, and the UE 115 may receive the DCI message 210 upon a successful BD attempt 815. As described herein, a BD attempt 815 may refer to any combination of one or more of a BD attempt 815-a through a BD attempt 815-n.

Rather than performing each BD attempt 815 over a common unit of REs, such as a CCE, the UE 115 may perform BD attempts 815 using a resource allocation unit of REs that is a function of payload size, coding rate, or any combination thereof. The coding rate that the UE 115 uses to decode the PDCCH may be different for different DCI formats 830, and the network entity 105 may indicate the coding rate to the UE 115 using a beta parameter. The beta parameter may indicate an offset relative to a coding rate for a data message that is scheduled by the DCI (e.g., a coding rate for PDSCH). In some examples, the network entity 105 may indicate the resource allocation unit for PDCCH that is a function of the payload size, the coding rate, or any combination thereof, to the UE 115. The network entity 105 may indicate the coding rate, the resource allocation unit for PDCCH, or both, via RRC signaling, a MAC-CE, or a previous DCI message.

In some examples, the UE 115 may demodulate REs of the quantity of REs 805 using multiple candidate modulation orders. The network entity 105 may indicate the candidate modulation orders to the UE, and the modulation orders may include QPSK, 4-QAM, 8-QAM, 16-QAM, 32-QAM, and 64-QAM, among other modulation orders. A UE 115 may perform BD attempt 815 in accordance with one or more of the candidate modulation orders, and a quantity of REs for a BD attempt 815 (e.g., a resource allocation unit) may vary based on the candidate modulation order.

The UE 115 may demodulate a set of REs 810-a based on a first candidate modulation order (e.g., QPSK). The UE 115 may perform a BD attempt 815-a, a BD attempt 815-b, a BD attempt 815-c, and a BD attempt 815-d for a DCI format 830-a using the set of REs 810-a demodulated in accordance with the first candidate modulation order and in accordance with a payload size of the DCI format 830-*a* and a coding rate value (e.g., common beta parameter, per DCI beta parameter). The UE 115 may perform a BD attempt 815-*e*, a BD attempt 815-*f*, and a BD attempt 815-*g* for the DCI format 830-*b* using the set of REs 810-*a* and in accordance with a payload size of the DCI format 830-*b* and a second coding rate value, which may the same as or different from the first coding rate value.

The UE 115 may demodulate a set of REs 810-*b* based on a second candidate modulation order (e.g., 16-QAM). The quantity of REs of the set of REs 810-*a* may be larger or smaller than the quantity of REs of the set of REs 810-*b* based on the first candidate modulation order being different from the second candidate modulation order. The UE 115 may perform a BD attempt 815-*h*, a BD attempt 815-*i*, a BD attempt 815-*j*, and a BD attempt 815-*k* for the DCI format 830-*c* using the set of REs 810-*b* demodulated in accordance with the second candidate modulation order and in accordance with a payload size of the DCI format 830-*c* and a third coding rate value (e.g., common beta parameter, per DCI beta parameter), which may the same as or different from the first and second coding rate values. The UE 115 may perform a BD attempt 815-*l*, a BD attempt 815-*m*, and a BD attempt 815-*n* for the DCI format 830-*d* using the set of REs 810-*b* demodulated in accordance with the second candidate modulation order and in accordance with a payload size of the DCI format 830-*d* and a fourth coding rate value, which may be the same as or different from the first, second, and third coding rate values. Each of the BD attempts 815 for the second candidate modulate order may include a larger or smaller quantity of REs (e.g., a larger or smaller resource allocation unit) compared with the BD attempts 815 for the first candidate modulation order based on the set of REs 810-*b* being larger or smaller than the set of REs 810-*a*.

Performing BD using multiple candidate modulation orders may use a greater quantity of a BD budget or capability of the UE 115 because the UE 115 may perform a greater quantity of BD attempts 815 compared with a quantity of BD attempts 815 for a single modulation order. Performing BD for multiple modulation orders may increase power consumption or processing at the UE, while increasing reliability or accuracy of the decoded DCI message. As such, in some implementations, the network entity 105 or the UE 115, or both, may balance whether to use multiple candidate modulation orders in accordance with the tradeoff between lower power consumption and greater reliability. In some aspects, the UE 115 and the network entity 105 may exchange one or more messages (e.g., capability messages) via which the UE 115 may indicate whether the UE 115 is capable of multiple candidate modulation orders. In some aspects, a same DCI format decoded in accordance with two different modulation orders may, at least for the purposes of BD attempts 815 at the UE 115, be understood as two different DCI formats. For example, the DCI format 830-*a* and the DCI format 830-*c* may actually be a same DCI format 830, but the UE 115 may interpret the DCI format 830-*a* and the DCI format 830-*c* as different in accordance with performing BD attempts for the DCI format 830-*a* and the DCI format 830-*c* using two different candidate modulation orders.

Figure 9:
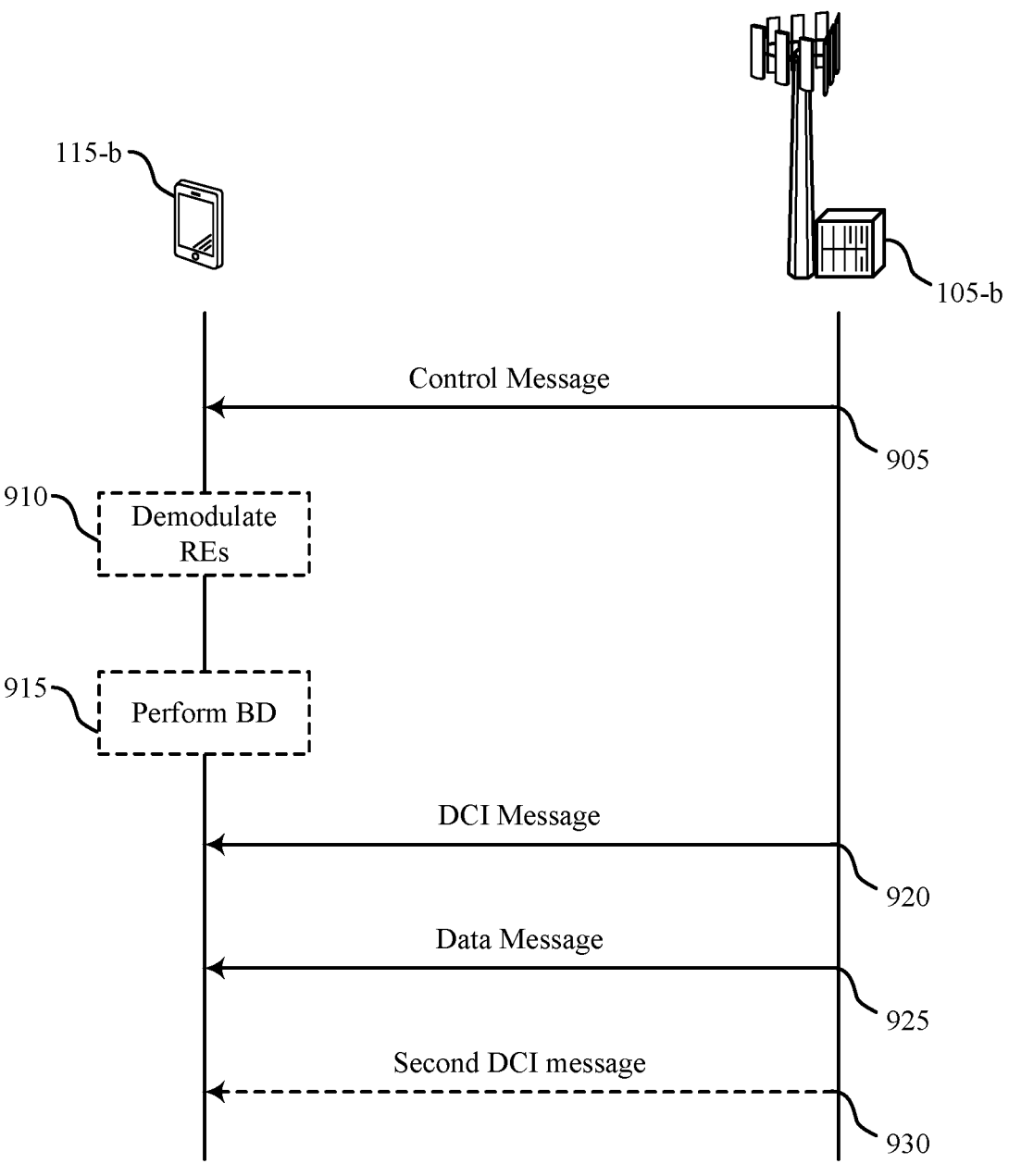
FIG. 9 shows an example of a process flow that supports PDCCH rate control in accordance with one or more aspects of the present disclosure.

FIG. 9 shows an example of a process flow 900 that supports PDCCH rate control in accordance with one or more aspects of the present disclosure. The process flow 900 may implement or may be implemented by aspects of the wireless communications system 100 or the wireless communications system 200. For example, the process flow 900 may include a UE 115-*b* and a network entity 105-*b*, which may be examples of corresponding devices as described herein with reference to FIGS. 1 and 2. In the following description of the process flow 900, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 900, and other operations may be added to the process flow 900.

At 905, the UE 115-*b* may receive a control message indicating a coding rate value (e.g., beta parameter) corresponding to a DCI format. The coding rate value may be indicative of a coding rate (e.g., a data rate) of the DCI format. In some cases, the UE 115-*b* may receive an indication of a coding rate of a data message (e.g., a PDSCH), and the coding rate value may indicate an offset (e.g., backoff) associated with the coding rate of the data message. In some examples, the UE 115-*b* may receive an indication that the coding rate corresponds to a set of multiple DCI formats including the DCI format. In other examples, the UE 115-*b* may receive indications of a set of multiple coding rate values including the coding value, and each of the set of multiple coding rate values may correspond to a respective DCI format of a set of multiple DCI formats. The UE 115-*b* may receive an indication that both a first coding rate value and a second coding rate value correspond to the DCI format. In some cases, the control message may be a RRC message, a MAC-CE message, or a previous DCI message.

At 910, the UE 115-*b* may demodulate a set of multiple REs of a PDCCH. In some examples, the UE 115-*b* may demodulate a single set of multiple REs of the PDCCH for subsequent BD attempts. In some other examples, the UE 115-*b* may demodulate a first set of multiple REs of the PDCCH in accordance with a first modulation order (e.g., a first modulation scheme) and may demodulate a second set of multiple REs of the PDCCH in accordance with a second modulation order (e.g., a second modulation scheme). The second set of multiple REs may at least partially overlap with the first set of multiple REs.

At 915, the UE 115-*b* may perform, using the set of multiple REs, one or more BD attempts for a DCI message (e.g., to attempt to receive the DCI message) in accordance with the payload size and the coding rate value. In some examples, the UE 115-*b* may perform a first set of one or more BD attempts using one or more first RE sets and may perform a second set of one or more BD attempts using one or more second RE sets. The one or more first RE sets and the one or more second RE sets may be associated with a first and second DCI format, respectively, a first and second coding rate, respectively, a first and second aggregation level, respectively, or a first and second modulation order, respectively.

At 920, the UE 115-*b* may receive, via a quantity of REs that is based at least in part on a payload size and the coding rate value, the DCI message of the DCI format that. The DCI message may include scheduling information associated with the data message. In some cases, receiving the DCI message may be based on performing the one or more BD attempts. In some examples, the UE 115-*b* may select the quantity of REs via which the DCI message is received based on a second quantity of REs associated with a second DCI format with a largest or smallest payload size relative to other DCI formats. The quantity of REs may equal the second quantity of REs.

At 925, the UE 115-*b* may receive the data message in accordance with the scheduling information. In some examples, the UE 115-*b* may receive the DCI message via a PDCCH multiplexed with a PDSCH that carries the data message. At 930, the UE 115-*b* may receive, via a second quantity of REs that is based on a second payload size of a second DCI format and the coding rate value, a second DCI message of the second DCI format of the set of multiple DCI formats.

Figure 10:
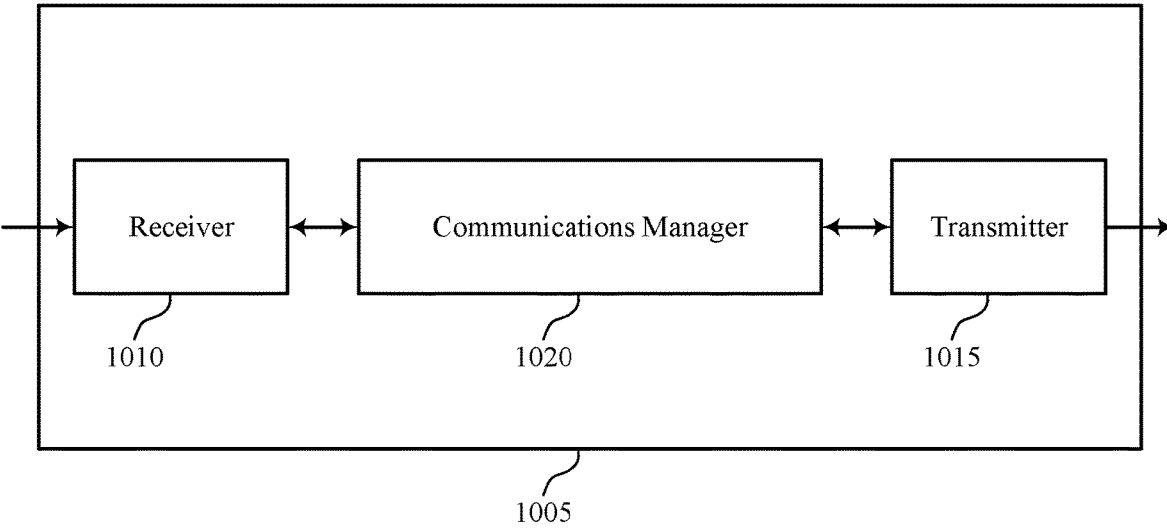
FIGS. 10 and 11 show block diagrams of devices that support PDCCH rate control in accordance with one or more aspects of the present disclosure.

FIG. 10 shows a block diagram 1000 of a device 1005 that supports PDCCH rate control in accordance with one or more aspects of the present disclosure. The device 1005 may be an example of aspects of a UE 115 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor (not shown), which may be coupled with at least one memory (not shown), to, individually or collectively, support or enable the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to PDCCH rate control). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to PDCCH rate control). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of PDCCH rate control as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. For example, the communications manager 1020 is capable of, configured to, or operable to support a means for receiving a control message indicating a coding rate value corresponding to a DCI format, where the coding rate value is indicative of a coding rate of the DCI format. The communications manager 1020 is capable of, configured to, or operable to support a means for receiving, via a quantity of REs that is based on a payload size and the coding rate value, a DCI message of the DCI format that includes scheduling information associated with a data message. The communications manager 1020 is capable of, configured to, or operable to support a means for receiving the data message in accordance with the scheduling information.

By including or configuring the communications manager 1020 in accordance with examples as described herein, the device 1005 (e.g., at least one processor controlling or otherwise coupled with the receiver 1010, the transmitter 1015, the communications manager 1020, or any combination thereof) may support techniques for more efficient utilization of communication resources by multiplexing a same set of resources for transmission of both PDCCH and PDSCH. The device 1005 may support reduced power consumption by associating coding rates of PDCCH with coding rates of PDSCH, thereby reducing control signaling overhead.

Figure 11:
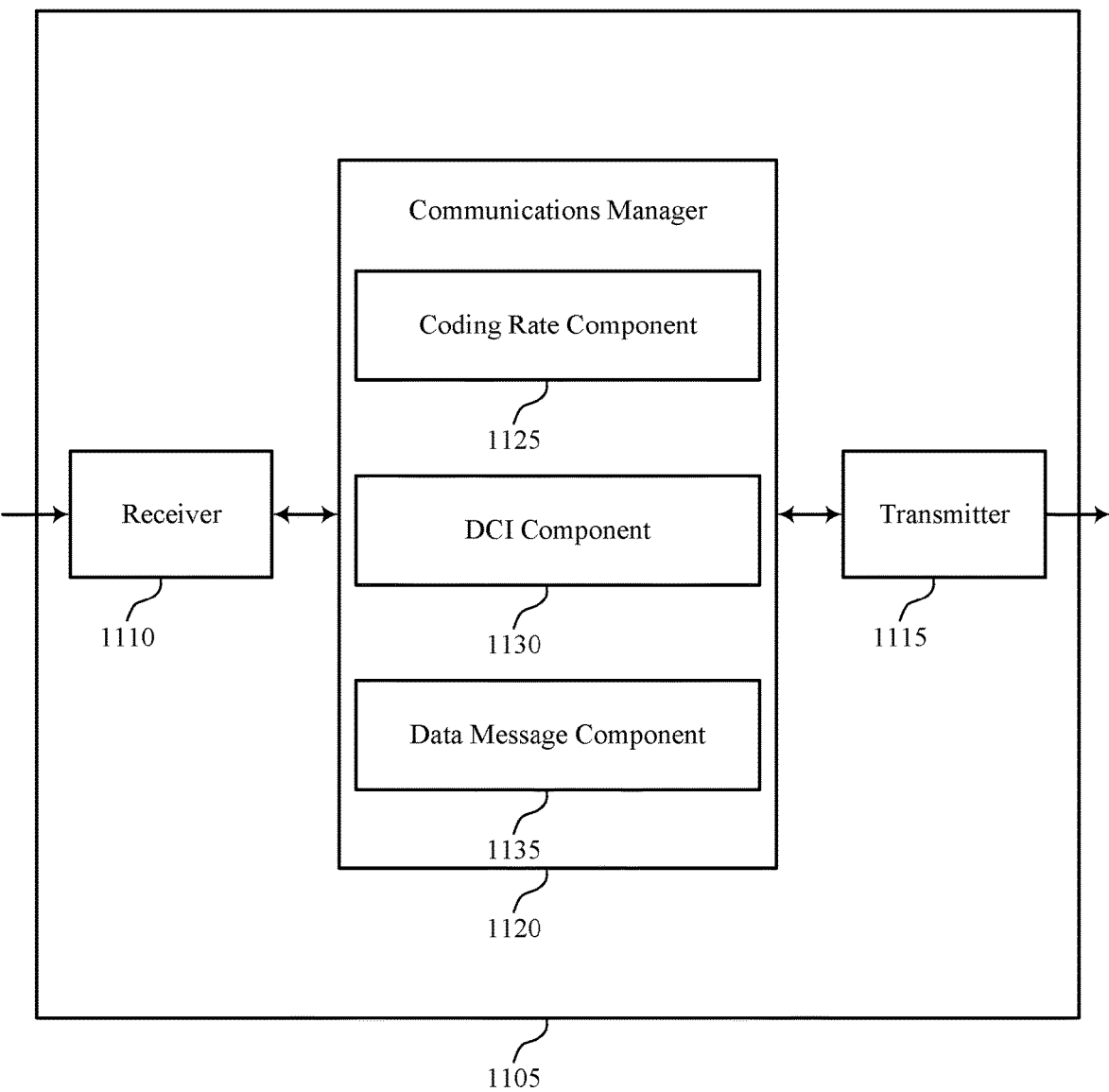

FIG. 11 shows a block diagram 1100 of a device 1105 that supports PDCCH rate control in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor (not shown), which may be coupled with at least one memory (not shown), to support the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to PDCCH rate control). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to PDCCH rate control). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of PDCCH rate control as described herein. For example, the communications manager 1120 may include a coding rate component 1125, a DCI component 1130, a data message component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a UE in accordance with examples as disclosed herein. The coding rate component 1125 is capable of, configured to, or operable to support a means for receiving a control message indicating a coding rate value corresponding to a DCI format, where the coding rate value is indicative of a coding rate of the DCI format. The DCI component 1130 is capable of, configured to, or operable to support a means for receiving, via a quantity of REs that is based on a payload size and the coding rate value, a DCI message of the DCI format that includes scheduling information associated with a data message. The data message component 1135 is capable of, configured to, or operable to support a means for receiving the data message in accordance with the scheduling information.

Figure 12:
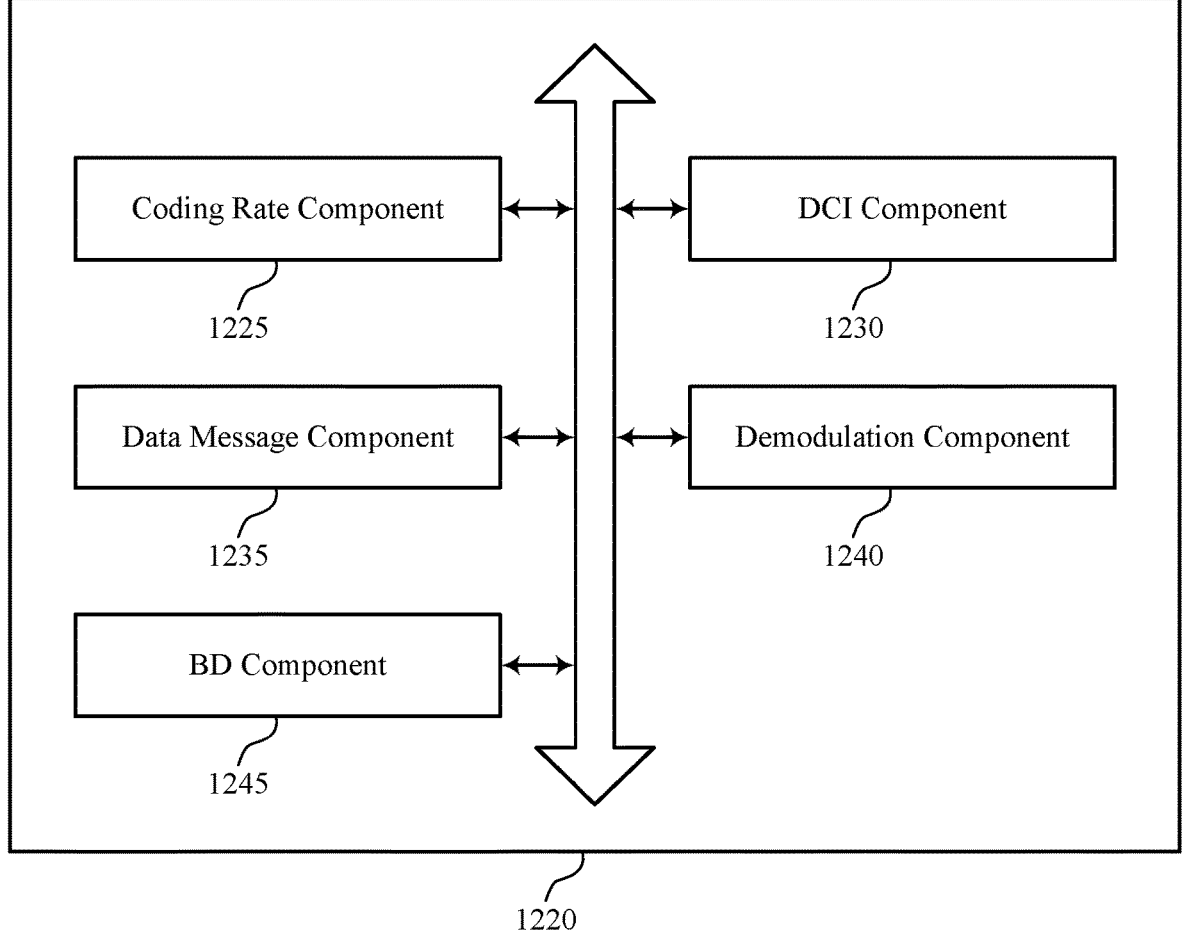
FIG. 12 shows a block diagram of a communications manager that supports PDCCH rate control in accordance with one or more aspects of the present disclosure.

FIG. 12 shows a block diagram 1200 of a communications manager 1220 that supports PDCCH rate control in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of PDCCH rate control as described herein. For example, the communications manager 1220 may include a coding rate component 1225, a DCI component 1230, a data message component 1235, a demodulation component 1240, a BD component 1245, or any combination thereof. Each of these components, or components or subcomponents thereof (e.g., one or more processors, one or more memories), may communicate, directly or indirectly, with one another (e.g., via one or more buses).

The communications manager 1220 may support wireless communication at a UE in accordance with examples as disclosed herein. The coding rate component 1225 is capable of, configured to, or operable to support a means for receiving a control message indicating a coding rate value corresponding to a DCI format, where the coding rate value is indicative of a coding rate of the DCI format. The DCI component 1230 is capable of, configured to, or operable to support a means for receiving, via a quantity of REs that is based on a payload size and the coding rate value, a DCI message of the DCI format that includes scheduling information associated with a data message. The data message component 1235 is capable of, configured to, or operable to support a means for receiving the data message in accordance with the scheduling information.

In some examples, to support receiving the DCI message, the DCI component 1230 is capable of, configured to, or operable to support a means for receiving the DCI message via a PDCCH multiplexed with a PDSCH that carries the data message.

In some examples, the coding rate component 1225 is capable of, configured to, or operable to support a means for receiving an indication of a coding rate of the data message, where the coding rate value indicates an offset associated with the coding rate of the data message.

In some examples, to support receiving the control message, the coding rate component 1225 is capable of, configured to, or operable to support a means for receiving an indication that the coding rate value corresponds to a set of multiple DCI formats including the DCI format.

In some examples, the DCI component 1230 is capable of, configured to, or operable to support a means for receiving, via a second quantity of REs that is based on a second payload size of a second DCI format and the coding rate value, a second DCI message of the second DCI format of the set of multiple DCI formats.

In some examples, to support receiving the control message, the coding rate component 1225 is capable of, configured to, or operable to support a means for receiving indications of a set of multiple coding rate values including the coding rate value, where each of the set of multiple coding rate values corresponds to a respective DCI format of a set of multiple DCI formats.

In some examples, a second coding rate value corresponding to a second DCI format of the set of multiple DCI formats indicates a second coding rate higher than the coding rate based on a second payload size of the second DCI format being larger than the payload size.

In some examples, a second coding rate value corresponding to a second DCI format of the set of multiple DCI formats indicates a second coding rate lower than the coding rate based on a second payload size of the second DCI format being smaller than the payload size.

In some examples, the DCI component 1230 is capable of, configured to, or operable to support a means for selecting the quantity of REs via which the DCI message is received based on a second quantity of REs associated with a second DCI format with a largest payload size relative to other DCI formats, where the quantity of REs equals the second quantity of REs.

In some examples, the DCI component 1230 is capable of, configured to, or operable to support a means for selecting the quantity of REs via which the DCI message is received based on a second quantity of REs associated with a second DCI format with a smallest payload size relative to other DCI formats, where the quantity of REs equals the second quantity of REs.

In some examples, the demodulation component 1240 is capable of, configured to, or operable to support a means for demodulating a set of multiple REs of a PDCCH. In some examples, the BD component 1245 is capable of, configured to, or operable to support a means for performing, using the set of multiple REs, one or more BD attempts for the DCI message in accordance with the payload size and the coding rate value, where receiving the DCI message is based on performing the one or more BD attempts.

In some examples, to support performing the one or more BD attempts, the BD component 1245 is capable of, configured to, or operable to support a means for performing a first set of one or more BD attempts using one or more first RE sets each associated with a first aggregation level. In some examples, to support performing the one or more BD attempts, the BD component 1245 is capable of, configured to, or operable to support a means for performing a second set of one or more BD attempts using one or more second RE sets each associated with a second aggregation level, where each of the one or more first RE sets and the one or more second RE sets at least partially span the set of multiple REs, and where the quantity of REs via which the DCI message is received is further based on the first aggregation level or the second aggregation level.

In some examples, to support receiving the control message, the coding rate component 1225 is capable of, configured to, or operable to support a means for receiving an indication that both a first coding rate value and a second coding rate value correspond to the DCI format, where the first coding rate value and the second coding rate value are indicative of a first coding rate and a second coding rate, respectively, of the DCI format, and where the coding rate value is one of the first coding rate value and the second coding rate value.

In some examples, the demodulation component 1240 is capable of, configured to, or operable to support a means for demodulating a set of multiple REs of a PDCCH. In some examples, the BD component 1245 is capable of, configured to, or operable to support a means for performing, using the set of multiple REs, one or more BD attempts for the DCI message in accordance with both the first coding rate value and the second coding rate value.

In some examples, to support performing the one or more BD attempts in accordance with both the first coding rate value and the second coding rate value, the BD component 1245 is capable of, configured to, or operable to support a means for performing a first set of one or more BD attempts using one or more first RE sets each associated with a first quantity of REs that is based on the payload size and the first coding rate value. In some examples, to support performing the one or more BD attempts in accordance with both the first coding rate value and the second coding rate value, the BD component 1245 is capable of, configured to, or operable to support a means for performing a second set of one or more BD attempts using one or more second RE sets each associated with a second quantity of REs that is based on the payload size and the second coding rate value, where each of the one or more first RE sets and the one or more second RE sets at least partially span the set of multiple REs, and where the quantity of REs via which the DCI message is received is one of the first quantity of REs or the second quantity of REs.

In some examples, the demodulation component 1240 is capable of, configured to, or operable to support a means for demodulating a first set of multiple REs of a PDCCH in accordance with a first modulation scheme. In some examples, the BD component 1245 is capable of, configured to, or operable to support a means for performing, using the first set of multiple REs demodulated in accordance with the first modulation scheme, a first set of one or more BD attempts for the DCI message in accordance with the payload size and the coding rate value. In some examples, the demodulation component 1240 is capable of, configured to, or operable to support a means for demodulating a second set of multiple REs of the PDCCH in accordance with a second modulation scheme, the second set of multiple REs at least partially overlapping with the first set of multiple REs. In some examples, the BD component 1245 is capable of, configured to, or operable to support a means for performing, using the second set of multiple REs demodulated in accordance with the second modulation scheme, a second set of one or more BD attempts for the DCI message in accordance with the payload size and the coding rate value, where receiving the DCI message is based on performing one of the first set of one or more BD attempts or the second set of one or more BD attempts.

In some examples, each of a set of multiple DCI formats including the DCI format is associated with a respective quantity of REs based on a respective payload size and a respective coding rate value.

In some examples, a resource allocation unit associated with the DCI format is a function of the payload size, the quantity of REs being further based on the resource allocation unit.

In some examples, the control message is received via an RRC message, a MAC-CE message, or a previous DCI message.

Figure 13:
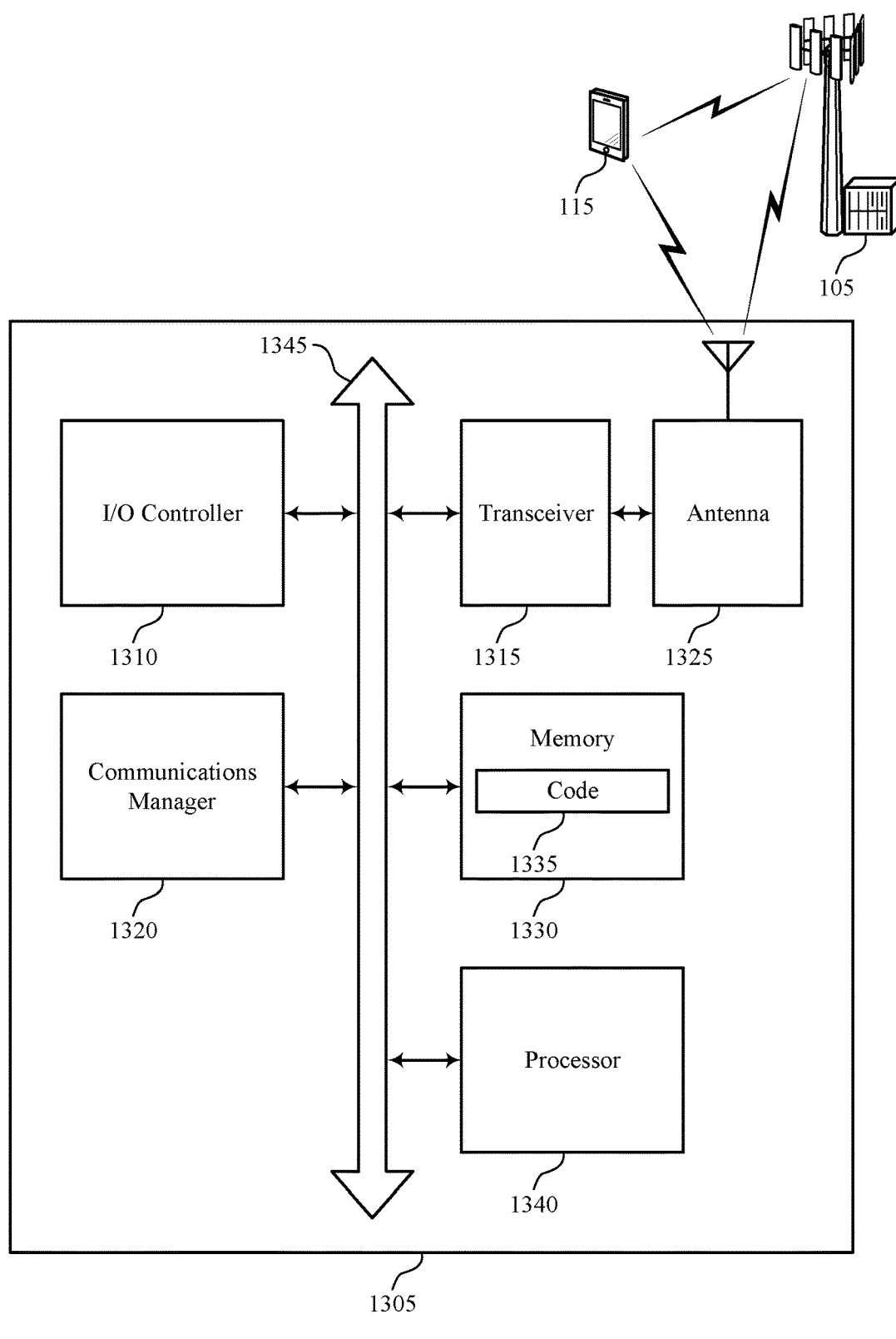
FIG. 13 shows a diagram of a system including a device that supports PDCCH rate control in accordance with one or more aspects of the present disclosure.

FIG. 13 shows a diagram of a system 1300 including a device 1305 that supports PDCCH rate control in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, at least one memory 1330, code 1335, and at least one processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of one or more processors, such as the at least one processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The at least one memory 1330 may include random access memory (RAM) and read-only memory (ROM). The at least one memory 1330 may store computer-readable, computer-executable code 1335 including instructions that, when executed by the at least one processor 1340, cause the device 1305 to perform various functions described herein. The code 1335 may be stored in a non-transitory computer-readable medium such as system memory or another type of memory. In some cases, the code 1335 may not be directly executable by the at least one processor 1340 but may cause a computer (e.g., when compiled and executed) to perform functions described herein. In some cases, the at least one memory 1330 may contain, among other things, a basic I/O system (BIOS) which may control basic hardware or software operation such as the interaction with peripheral components or devices.

The at least one processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1340 may be configured to operate a memory array using a memory controller. In some other cases, a memory controller may be integrated into the at least one processor 1340. The at least one processor 1340 may be configured to execute computer-readable instructions stored in a memory (e.g., the at least one memory 1330) to cause the device 1305 to perform various functions (e.g., functions or tasks supporting PDCCH rate control). For example, the device 1305 or a component of the device 1305 may include at least one processor 1340 and at least one memory 1330 coupled with or to the at least one processor 1340, the at least one processor 1340 and at least one memory 1330 configured to perform various functions described herein. In some examples, the at least one processor 1340 may include multiple processors and the at least one memory 1330 may include multiple memories. One or more of the multiple processors may be coupled with one or more of the multiple memories, which may, individually or collectively, be configured to perform various functions herein.

The communications manager 1320 may support wireless communication at a UE in accordance with examples as disclosed herein. For example, the communications manager 1320 is capable of, configured to, or operable to support a means for receiving a control message indicating a coding rate value corresponding to a DCI format, where the coding rate value is indicative of a coding rate of the DCI format. The communications manager 1320 is capable of, configured to, or operable to support a means for receiving, via a quantity of REs that is based on a payload size and the coding rate value, a DCI message of the DCI format that includes scheduling information associated with a data message. The communications manager 1320 is capable of, configured to, or operable to support a means for receiving the data message in accordance with the scheduling information.

By including or configuring the communications manager 1320 in accordance with examples as described herein, the device 1305 may support techniques for reduced latency and improved communication reliability. For example, data messages of a PDSCH may be multiplexed using FDM with a PDCCH, which may reduce latencies compared with using TDM to multiplex the two channels. The device 1305 may support improved communication reliability and flexibility of implementation by modifying coding rates on a per DCI format, which may allow for increased reliability of DCI messages for some DCI formats.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the at least one processor 1340, the at least one memory 1330, the code 1335, or any combination thereof. For example, the code 1335 may include instructions executable by the at least one processor 1340 to cause the device 1305 to perform various aspects of PDCCH rate control as described herein, or the at least one processor 1340 and the at least one memory 1330 may be otherwise configured to, individually or collectively, perform or support such operations.

Figure 14:
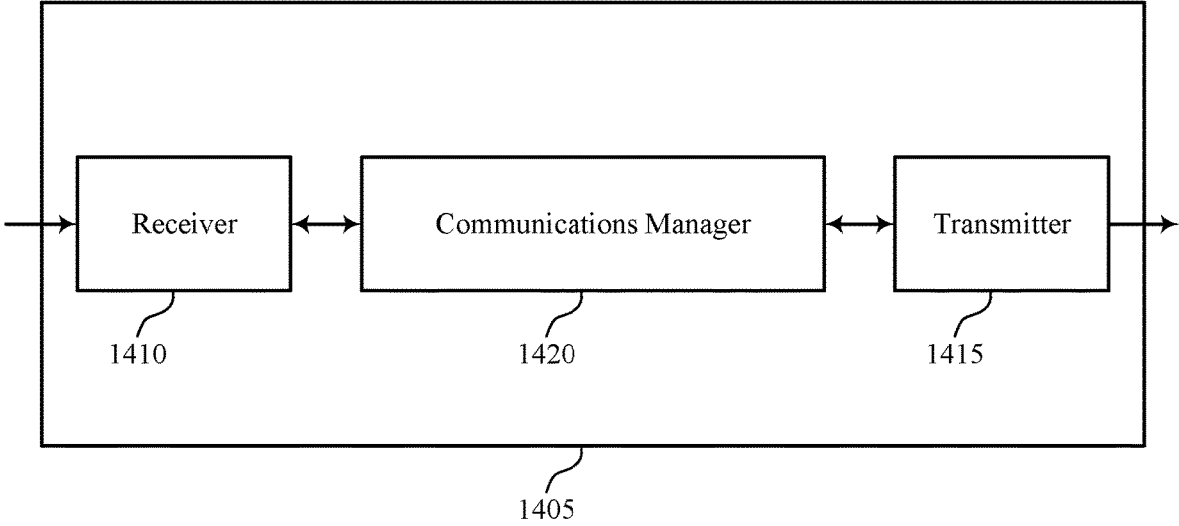
FIGS. 14 and 15 show block diagrams of devices that support PDCCH rate control in accordance with one or more aspects of the present disclosure.

FIG. 14 shows a block diagram 1400 of a device 1405 that supports PDCCH rate control in accordance with one or more aspects of the present disclosure. The device 1405 may be an example of aspects of a network entity 105 as described herein. The device 1405 may include a receiver 1410, a transmitter 1415, and a communications manager 1420. The device 1405, or one or more components of the device 1405 (e.g., the receiver 1410, the transmitter 1415, and the communications manager 1420), may include at least one processor (not shown), which may be coupled with at least one memory (not shown), to, individually or collectively, support or enable the described techniques. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of PDCCH rate control as described herein. For example, the communications manager 1420, the receiver 1410, the transmitter 1415, or various combinations or components thereof may be capable of performing one or more of the functions described herein.

In some examples, the communications manager 1420, the receiver 1410, the transmitter 1415, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1420, the receiver 1410, the transmitter 1415, or various combinations or components thereof may be implemented in code (e.g., as communications management software or firmware) executed by at least one processor. If implemented in code executed by at least one processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a network entity in accordance with examples as disclosed herein. For example, the communications manager 1420 is capable of, configured to, or operable to support a means for transmitting a control message indicating a coding rate value corresponding to a DCI format, where the coding rate value is indicative of a coding rate of the DCI format. The communications manager 1420 is capable of, configured to, or operable to support a means for transmitting, via a quantity of REs that is based on a payload size and the coding rate value, a DCI message of the DCI format that includes scheduling information associated with a data message. The communications manager 1420 is capable of, configured to, or operable to support a means for transmitting the data message in accordance with the scheduling information.

By including or configuring the communications manager 1420 in accordance with examples as described herein, the device 1405 (e.g., at least one processor controlling or otherwise coupled with the receiver 1410, the transmitter 1415, the communications manager 1420, or any combination thereof) may support techniques for more efficient utilization of communication resources by multiplexing a same set of resources for transmission of both PDCCH and PDSCH. The device 1405 may support reduced power consumption by associating coding rates of PDCCH with coding rates of PDSCH, thereby reducing control signaling overhead.

Figure 15:
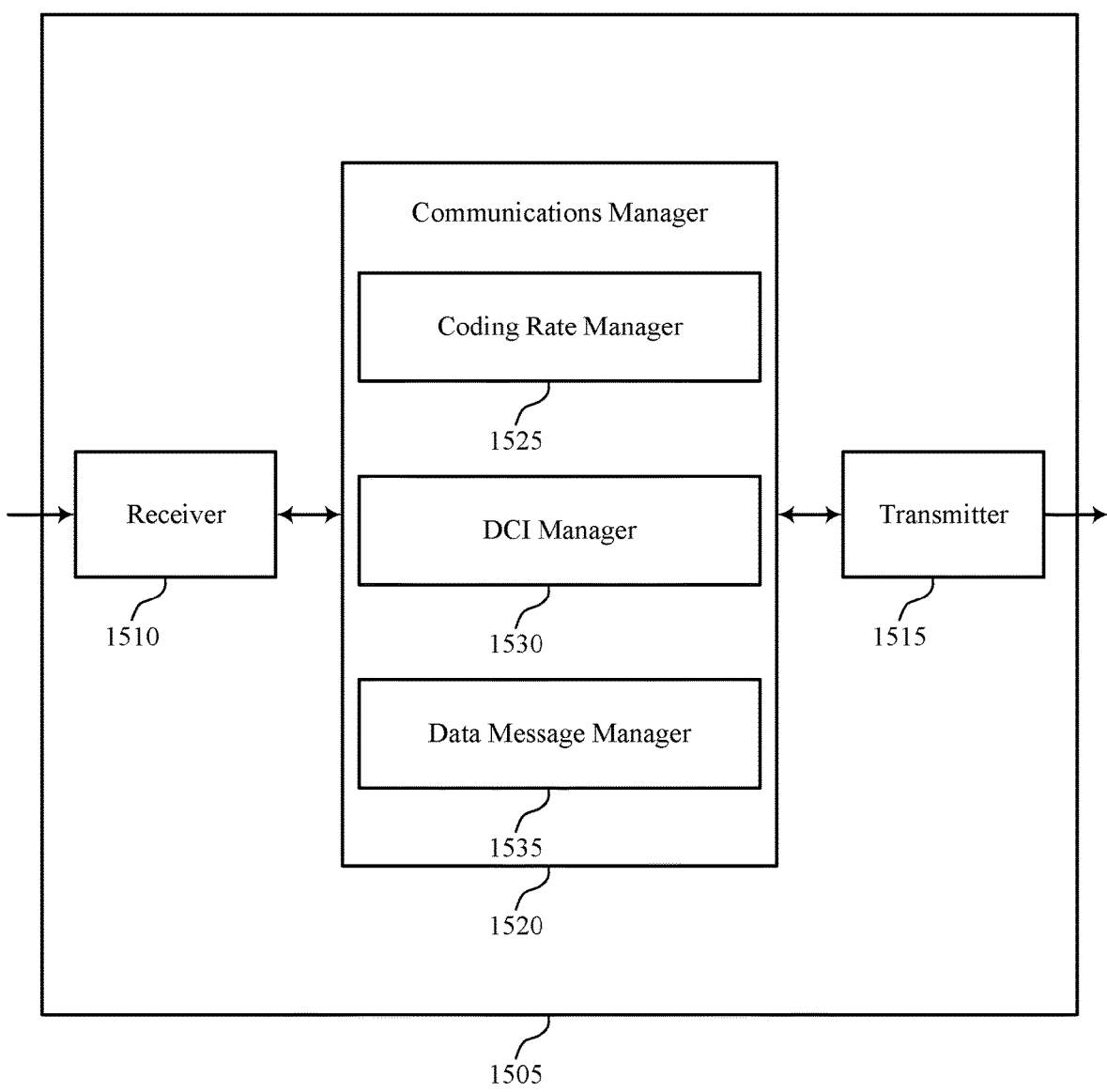

FIG. 15 shows a block diagram 1500 of a device 1505 that supports PDCCH rate control in accordance with one or more aspects of the present disclosure. The device 1505 may be an example of aspects of a device 1405 or a network entity 105 as described herein. The device 1505 may include a receiver 1510, a transmitter 1515, and a communications manager 1520. The device 1505, or one or more components of the device 1505 (e.g., the receiver 1510, the transmitter 1515, and the communications manager 1520), may include at least one processor (not shown), which may be coupled with at least one memory (not shown), to support the described techniques. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of PDCCH rate control as described herein. For example, the communications manager 1520 may include a coding rate manager 1525, a DCI manager 1530, a data message manager 1535, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communication at a network entity in accordance with examples as disclosed herein. The coding rate manager 1525 is capable of, configured to, or operable to support a means for transmitting a control message indicating a coding rate value corresponding to a DCI format, where the coding rate value is indicative of a coding rate of the DCI format. The DCI manager 1530 is capable of, configured to, or operable to support a means for transmitting, via a quantity of REs that is based on a payload size and the coding rate value, a DCI message of the DCI format that includes scheduling information associated with a data message. The data message manager 1535 is capable of, configured to, or operable to support a means for transmitting the data message in accordance with the scheduling information.

Figure 16:
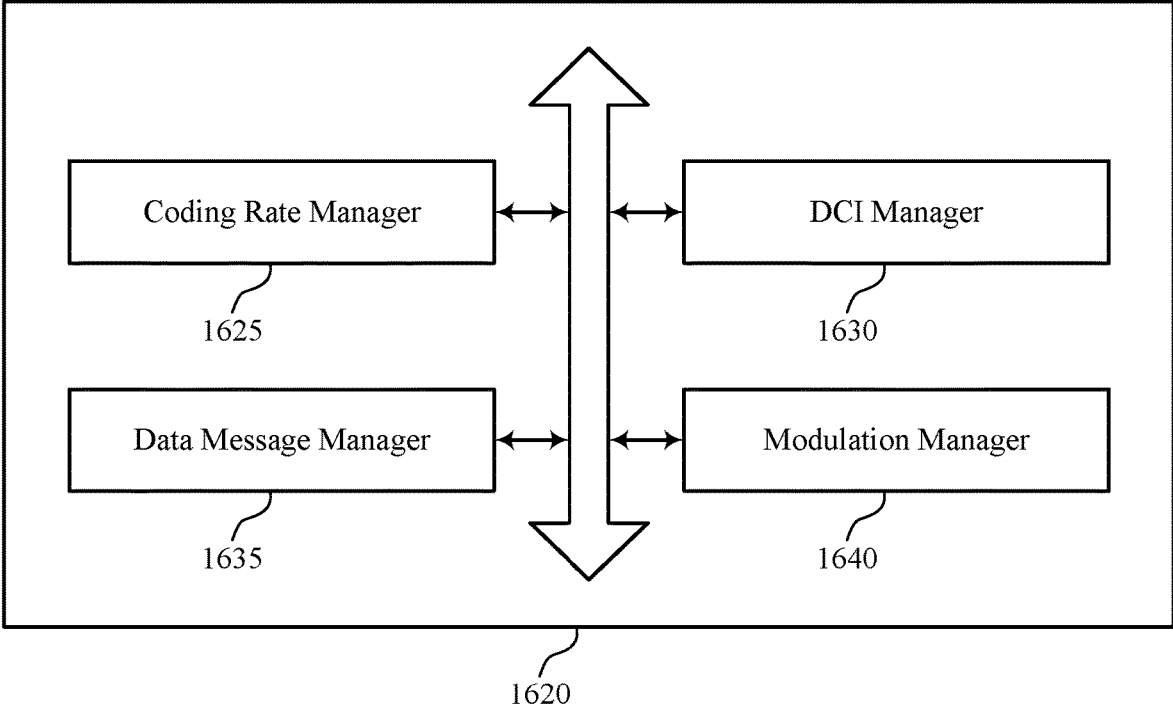
FIG. 16 shows a block diagram of a communications manager that supports PDCCH rate control in accordance with one or more aspects of the present disclosure.
Figure 16:

FIG. 16 shows a block diagram 1600 of a communications manager 1620 that supports PDCCH rate control in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of PDCCH rate control as described herein. For example, the communications manager 1620 may include a coding rate manager 1625, a DCI manager 1630, a data message manager 1635, a modulation manager 1640, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communication at a network entity in accordance with examples as disclosed herein. The coding rate manager 1625 is capable of, configured to, or operable to support a means for transmitting a control message indicating a coding rate value corresponding to a DCI format, where the coding rate value is indicative of a coding rate of the DCI format. The DCI manager 1630 is capable of, configured to, or operable to support a means for transmitting, via a quantity of REs that is based on a payload size and the coding rate value, a DCI message of the DCI format that includes scheduling information associated with a data message. The data message manager 1635 is capable of, configured to, or operable to support a means for transmitting the data message in accordance with the scheduling information.

In some examples, to support transmitting the DCI message, the DCI manager 1630 is capable of, configured to, or operable to support a means for transmitting the DCI message via a PDCCH multiplexed with a PDSCH that carries the data message.

In some examples, the coding rate manager 1625 is capable of, configured to, or operable to support a means for transmitting an indication of a coding rate of the data message, where the coding rate value indicates an offset associated with the coding rate of the data message.

In some examples, to support transmitting the control message, the coding rate manager 1625 is capable of, configured to, or operable to support a means for transmitting an indication that the coding rate value corresponds to a set of multiple DCI formats including the DCI format.

In some examples, the DCI manager 1630 is capable of, configured to, or operable to support a means for transmitting, via a second quantity of REs that is based on a second payload size of a second DCI format and the coding rate value, a second DCI message of the second DCI format of the set of multiple DCI formats.

In some examples, to support transmitting the control message, the coding rate manager 1625 is capable of, configured to, or operable to support a means for transmitting indications of a set of multiple coding rate values including the coding rate value, each of the set of multiple coding rate values corresponding to a respective DCI format of a set of multiple DCI formats.

In some examples, a second coding rate value corresponding to a second DCI format of the set of multiple DCI formats indicates a second coding rate higher than the coding rate based on a second payload size of the second DCI format being larger than the payload size.

In some examples, a second coding rate value corresponding to a second DCI format of the set of multiple DCI formats indicates a second coding rate lower than the coding rate based on a second payload size of the second DCI format being smaller than the payload size.

In some examples, the DCI manager 1630 is capable of, configured to, or operable to support a means for selecting the quantity of REs via which the DCI message is transmitted based on a second quantity of REs associated with a second DCI format with a largest payload size relative to other DCI formats, where the quantity of REs equals the second quantity of REs.

In some examples, the DCI manager 1630 is capable of, configured to, or operable to support a means for selecting the quantity of REs via which the DCI message is transmitted based on a second quantity of REs associated with a second DCI format with a smallest payload size relative to other DCI formats, where the quantity of REs equals the second quantity of REs.

In some examples, to support transmitting the DCI message, the DCI manager 1630 is capable of, configured to, or operable to support a means for transmitting the DCI message in accordance with an aggregation level, where the quantity of REs via which the DCI message is transmitted is further based on the aggregation level.

In some examples, to support transmitting the control message, the coding rate manager 1625 is capable of, configured to, or operable to support a means for transmitting an indication that both a first coding rate value and a second coding rate value correspond to the DCI format, where the first coding rate value and the second coding rate value are indicative of a first coding rate and a second coding rate, respectively, of the DCI format, and where the coding rate value is one of the first coding rate value and the second coding rate value.

In some examples, to support transmitting the DCI message, the DCI manager 1630 is capable of, configured to, or operable to support a means for transmitting a first DCI message of the DCI format via a first quantity of REs that is based on the payload size and the first coding rate value. In some examples, to support transmitting the DCI message, the DCI manager 1630 is capable of, configured to, or operable to support a means for transmitting a second DCI message of the DCI format via a second quantity of REs that is based on the payload size and the second coding rate value.

In some examples, to support transmitting the DCI message, the modulation manager 1640 is capable of, configured to, or operable to support a means for transmitting the DCI message in accordance with a modulation scheme, where the quantity of REs via which the DCI message is transmitted is further based on the modulation scheme.

In some examples, each of a set of multiple DCI formats including the DCI format is associated with a respective quantity of REs based on a respective payload size and a respective coding rate value.

In some examples, a resource allocation unit associated with the DCI format is a function of the payload size, the quantity of REs being further based on the resource allocation unit.

In some examples, the control message is transmitted via an RRC message, a MAC-CE message, or a previous DCI message.

Figure 17:
FIG. 17 shows a diagram of a system including a device that supports PDCCH rate control in accordance with one or more aspects of the present disclosure.

FIG. 17 shows a diagram of a system 1700 including a device 1705 that supports PDCCH rate control in accordance with one or more aspects of the present disclosure. The device 1705 may be an example of or include the components of a device 1405, a device 1505, or a network entity 105 as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, at least one memory 1725, code 1730, and at least one processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. In some implementations, the transceiver 1710 may include one or more interfaces, such as one or more interfaces coupled with the one or more antennas 1715 that are configured to support various receiving or obtaining operations, or one or more interfaces coupled with the one or more antennas 1715 that are configured to support various transmitting or outputting operations, or any combination thereof. In some implementations, the transceiver 1710 may include or be configured for coupling with one or more processors or one or more memory components that are operable to perform or support operations based on received or obtained information or signals, or to generate information or other signals for transmission or other outputting, or any combination thereof. In some implementations, the transceiver 1710, or the transceiver 1710 and the one or more antennas 1715, or the transceiver 1710 and the one or more antennas 1715 and one or more processors or one or more memory components (e.g., the at least one processor 1735, the at least one memory 1725, or both), may be included in a chip or chip assembly that is installed in the device 1705. In some examples, the transceiver 1710 may be operable to support communications via one or more communications links (e.g., a communication link 125, a backhaul communication link 120, a midhaul communication link 162, a fronthaul communication link 168).

The at least one memory 1725 may include RAM, ROM, or any combination thereof. The at least one memory 1725 may store computer-readable, computer-executable code 1730 including instructions that, when executed by one or more of the at least one processor 1735, cause the device 1705 to perform various functions described herein. The code 1730 may be stored in a non-transitory computer-readable medium such as system memory or another type of memory. In some cases, the code 1730 may not be directly executable by a processor of the at least one processor 1735 but may cause a computer (e.g., when compiled and executed) to perform functions described herein. In some cases, the at least one memory 1725 may contain, among other things, a BIOS which may control basic hardware or software operation such as the interaction with peripheral components or devices. In some examples, the at least one processor 1735 may include multiple processors and the at least one memory 1725 may include multiple memories. One or more of the multiple processors may be coupled with one or more of the multiple memories which may, individually or collectively, be configured to perform various functions herein (for example, as part of a processing system).

The at least one processor 1735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1735 may be configured to operate a memory array using a memory controller. In some other cases, a memory controller may be integrated into one or more of the at least one processor 1735. The at least one processor 1735 may be configured to execute computer-readable instructions stored in a memory (e.g., one or more of the at least one memory 1725) to cause the device 1705 to perform various functions (e.g., functions or tasks supporting PDCCH rate control). For example, the device 1705 or a component of the device 1705 may include at least one processor 1735 and at least one memory 1725 coupled with one or more of the at least one processor 1735, the at least one processor 1735 and the at least one memory 1725 configured to perform various functions described herein. The at least one processor 1735 may be an example of a cloud-computing platform (e.g., one or more physical nodes and supporting software such as operating systems, virtual machines, or container instances) that may host the functions (e.g., by executing code 1730) to perform the functions of the device 1705. The at least one processor 1735 may be any one or more suitable processors capable of executing scripts or instructions of one or more software programs stored in the device 1705 (such as within one or more of the at least one memory 1725). In some implementations, the at least one processor 1735 may be a component of a processing system. A processing system may generally refer to a system or series of machines or components that receives inputs and processes the inputs to produce a set of outputs (which may be passed to other systems or components of, for example, the device 1705). For example, a processing system of the device 1705 may refer to a system including the various other components or subcomponents of the device 1705, such as the at least one processor 1735, or the transceiver 1710, or the communications manager 1720, or other components or combinations of components of the device 1705. The processing system of the device 1705 may interface with other components of the device 1705, and may process information received from other components (such as inputs or signals) or output information to other components. For example, a chip or modem of the device 1705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1705 may transmit information output from the chip or modem. Additionally, or alternatively, in some implementations, the one or more interfaces may refer to an interface between the processing system of the chip or modem and a receiver, such that the device 1705 may obtain information or signal inputs, and the information may be passed to the processing system. A person having ordinary skill in the art will readily recognize that a first interface also may obtain information or signal inputs, and a second interface also may output information or signal outputs.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the at least one memory 1725, the code 1730, and the at least one processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105, and may include a controller or scheduler for controlling communications with ULEs 115 in cooperation with other network entities 105. In some examples, the communications manager 1720 may support an X2 interface within an LTE/LTE-A wireless communications network technology to provide communication between network entities 105.

The communications manager 1720 may support wireless communication at a network entity in accordance with examples as disclosed herein. For example, the communications manager 1720 is capable of, configured to, or operable to support a means for transmitting a control message indicating a coding rate value corresponding to a DCI format, where the coding rate value is indicative of a coding rate of the DCI format. The communications manager 1720 is capable of, configured to, or operable to support a means for transmitting, via a quantity of REs that is based on a payload size and the coding rate value, a DCI message of the DCI format that includes scheduling information associated with a data message. The communications manager 1720 is capable of, configured to, or operable to support a means for transmitting the data message in accordance with the scheduling information.

By including or configuring the communications manager 1720 in accordance with examples as described herein, the device 1705 may support techniques for reduced latency and improved communication reliability. For example, data messages of a PDSCH may be multiplexed using FDM with a PDCCH, which may reduce latencies compared with using TDM to multiplex the two channels. The device 1705 may support improved communication reliability and flexibility of implementation by modifying coding rates on a per DCI format, which may allow for increased reliability of DCI messages for some DCI formats.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. Although the communications manager 1720 is illustrated as a separate component, in some examples, one or more functions described with reference to the communications manager 1720 may be supported by or performed by the transceiver 1710, one or more of the at least one processor 1735, one or more of the at least one memory 1725, the code 1730, or any combination thereof (for example, by a processing system including at least a portion of the at least one processor 1735, the at least one memory 1725, the code 1730, or any combination thereof). For example, the code 1730 may include instructions executable by one or more of the at least one processor 1735 to cause the device 1705 to perform various aspects of PDCCH rate control as described herein, or the at least one processor 1735 and the at least one memory 1725 may be otherwise configured to, individually or collectively, perform or support such operations.

FIG. 18 shows a flowchart illustrating a method 1800 that supports PDCCH rate control in accordance with aspects of the present disclosure. The operations of the method 1800 may be implemented by a UE or its components as described herein. For example, the operations of the method 1800 may be performed by a UE 115 as described herein with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the method may include receiving a control message indicating a coding rate value corresponding to a DCI format, where the coding rate value is indicative of a coding rate of the DCI format. The operations of block 1805 may be performed in accordance with examples as disclosed herein. In some examples, aspects of the operations of 1805 may be performed by a coding rate component 1225 as described herein with reference to FIG. 12.

At 1810, the method may include receiving, via a quantity of REs that is based on a payload size and the coding rate value, a DCI message of the DCI format that includes scheduling information associated with a data message. The operations of block 1810 may be performed in accordance with examples as disclosed herein. In some examples, aspects of the operations of 1810 may be performed by a DCI component 1230 as described herein with reference to FIG. 12.

At 1815, the method may include receiving the data message in accordance with the scheduling information. The operations of block 1815 may be performed in accordance with examples as disclosed herein. In some examples, aspects of the operations of 1815 may be performed by a data message component 1235 as described herein with reference to FIG. 12.

FIG. 19 shows a flowchart illustrating a method 1900 that supports PDCCH rate control in accordance with aspects of the present disclosure. The operations of the method 1900 may be implemented by a UE or its components as described herein. For example, the operations of the method 1900 may be performed by a UE 115 as described herein with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1905, the method may include receiving a control message indicating a coding rate value corresponding to a DCI format, where the coding rate value is indicative of a coding rate of the DCI format. The operations of block 1905 may be performed in accordance with examples as disclosed herein. In some examples, aspects of the operations of 1905 may be performed by a coding rate component 1225 as described herein with reference to FIG. 12.

At 1910, the method may include receiving, via a quantity of REs that is based on a payload size and the coding rate value, a DCI message of the DCI format that includes scheduling information associated with a data message. The operations of block 1910 may be performed in accordance with examples as disclosed herein. In some examples, aspects of the operations of 1910 may be performed by a DCI component 1230 as described herein with reference to FIG. 12.

At 1915, the method may include receiving the DCI message via a PDCCH multiplexed with a PDSCH that carries the data message. The operations of block 1915 may be performed in accordance with examples as disclosed herein. In some examples, aspects of the operations of 1915 may be performed by a DCI component 1230 as described herein with reference to FIG. 12.

At 1920, the method may include receiving the data message in accordance with the scheduling information. The operations of block 1920 may be performed in accordance with examples as disclosed herein. In some examples, aspects of the operations of 1920 may be performed by a data message component 1235 as described herein with reference to FIG. 12.

FIG. 20 shows a flowchart illustrating a method 2000 that supports PDCCH rate control in accordance with aspects of the present disclosure. The operations of the method 2000 may be implemented by a UE or its components as described herein. For example, the operations of the method 2000 may be performed by a UE 115 as described herein with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 2005, the method may include receiving an indication of a coding rate of a data message. The operations of block 2005 may be performed in accordance with examples as disclosed herein. In some examples, aspects of the operations of 2005 may be performed by a coding rate component 1225 as described herein with reference to FIG. 12.

At 2010, the method may include receiving a control message indicating a coding rate value corresponding to a DCI format, where the coding rate value is indicative of a coding rate of the DCI format, where the coding rate value indicates an offset associated with the coding rate of the data message. The operations of block 2010 may be performed in accordance with examples as disclosed herein. In some examples, aspects of the operations of 2010 may be performed by a coding rate component 1225 as described herein with reference to FIG. 12.

At 2015, the method may include receiving, via a quantity of REs that is based on a payload size and the coding rate value, a DCI message of the DCI format that includes scheduling information associated with the data message. The operations of block 2015 may be performed in accordance with examples as disclosed herein. In some examples, aspects of the operations of 2015 may be performed by a DCI component 1230 as described herein with reference to FIG. 12.

At 2020, the method may include receiving the data message in accordance with the scheduling information. The operations of block 2020 may be performed in accordance with examples as disclosed herein. In some examples, aspects of the operations of 2020 may be performed by a data message component 1235 as described herein with reference to FIG. 12.

FIG. 21 shows a flowchart illustrating a method 2100 that supports PDCCH rate control in accordance with aspects of the present disclosure. The operations of the method 2100 may be implemented by a UE or its components as described herein. For example, the operations of the method 2100 may be performed by a UE 115 as described herein with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 2105, the method may include receiving a control message indicating a coding rate value corresponding to a DCI format, where the coding rate value is indicative of a coding rate of the DCI format. The operations of block 2105 may be performed in accordance with examples as disclosed herein. In some examples, aspects of the operations of 2105 may be performed by a coding rate component 1225 as described herein with reference to FIG. 12.

At 2110, the method may include receiving an indication that the coding rate value corresponds to a set of multiple DCI formats including the DCI format. The operations of block 2110 may be performed in accordance with examples as disclosed herein. In some examples, aspects of the operations of 2110 may be performed by a coding rate component 1225 as described herein with reference to FIG. 12.

At 2115, the method may include receiving, via a quantity of REs that is based on a payload size and the coding rate value, a DCI message of the DCI format that includes scheduling information associated with a data message. The operations of block 2115 may be performed in accordance with examples as disclosed herein. In some examples, aspects of the operations of 2115 may be performed by a DCI component 1230 as described herein with reference to FIG. 12.

At 2120, the method may include receiving the data message in accordance with the scheduling information. The operations of block 2120 may be performed in accordance with examples as disclosed herein. In some examples, aspects of the operations of 2120 may be performed by a data message component 1235 as described herein with reference to FIG. 12.

At 2125, the method may include receiving, via a second quantity of REs that is based on a second payload size of a second DCI format and the coding rate value, a second DCI message of the second DCI format of the set of multiple DCI formats. The operations of block 2125 may be performed in accordance with examples as disclosed herein. In some examples, aspects of the operations of 2125 may be performed by a DCI component 1230 as described herein with reference to FIG. 12.

FIG. 22 shows a flowchart illustrating a method 2200 that supports PDCCH rate control in accordance with aspects of the present disclosure. The operations of the method 2200 may be implemented by a network entity or its components as described herein. For example, the operations of the method 2200 may be performed by a network entity as described herein with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2205, the method may include transmitting a control message indicating a coding rate value corresponding to a DCI format, where the coding rate value is indicative of a coding rate of the DCI format. The operations of block 2205 may be performed in accordance with examples as disclosed herein. In some examples, aspects of the operations of 2205 may be performed by a coding rate manager 1625 as described herein with reference to FIG. 16.

At 2210, the method may include transmitting, via a quantity of REs that is based on a payload size and the coding rate value, a DCI message of the DCI format that includes scheduling information associated with a data message. The operations of block 2210 may be performed in accordance with examples as disclosed herein. In some examples, aspects of the operations of 2210 may be performed by a DCI manager 1630 as described herein with reference to FIG. 16.

At 2215, the method may include transmitting the data message in accordance with the scheduling information. The operations of block 2215 may be performed in accordance with examples as disclosed herein. In some examples, aspects of the operations of 2215 may be performed by a data message manager 1635 as described herein with reference to FIG. 16.

FIG. 23 shows a flowchart illustrating a method 2300 that supports PDCCH rate control in accordance with aspects of the present disclosure. The operations of the method 2300 may be implemented by a network entity or its components as described herein. For example, the operations of the method 2300 may be performed by a network entity as described herein with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2305, the method may include transmitting a control message indicating a coding rate value corresponding to a DCI format, where the coding rate value is indicative of a coding rate of the DCI format. The operations of block 2305 may be performed in accordance with examples as disclosed herein. In some examples, aspects of the operations of 2305 may be performed by a coding rate manager 1625 as described herein with reference to FIG. 16.

At 2310, the method may include transmitting, via a quantity of REs that is based on a payload size and the coding rate value, a DCI message of the DCI format that includes scheduling information associated with a data message. The operations of block 2310 may be performed in accordance with examples as disclosed herein. In some examples, aspects of the operations of 2310 may be performed by a DCI manager 1630 as described herein with reference to FIG. 16.

At 2315, the method may include transmitting the DCI message via a PDCCH multiplexed with a PDSCH that carries the data message. The operations of block 2315 may be performed in accordance with examples as disclosed herein. In some examples, aspects of the operations of 2315 may be performed by a DCI manager 1630 as described herein with reference to FIG. 16.

At 2320, the method may include transmitting the data message in accordance with the scheduling information. The operations of block 2320 may be performed in accordance with examples as disclosed herein. In some examples, aspects of the operations of 2320 may be performed by a data message manager 1635 as described herein with reference to FIG. 16.

FIG. 24 shows a flowchart illustrating a method 2400 that supports PDCCH rate control in accordance with aspects of the present disclosure. The operations of the method 2400 may be implemented by a network entity or its components as described herein. For example, the operations of the method 2400 may be performed by a network entity as described herein with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2405, the method may include transmitting an indication of a coding rate of a data message. The operations of block 2405 may be performed in accordance with examples as disclosed herein. In some examples, aspects of the operations of 2405 may be performed by a coding rate manager 1625 as described herein with reference to FIG. 16.

At 2410, the method may include transmitting a control message indicating a coding rate value corresponding to a DCI format, where the coding rate value is indicative of a coding rate of the DCI format, where the coding rate value indicates an offset associated with the coding rate of the data message. The operations of block 2410 may be performed in accordance with examples as disclosed herein. In some examples, aspects of the operations of 2410 may be performed by a coding rate manager 1625 as described herein with reference to FIG. 16.

At 2415, the method may include transmitting, via a quantity of REs that is based on a payload size and the coding rate value, a DCI message of the DCI format that includes scheduling information associated with the data message. The operations of block 2415 may be performed in accordance with examples as disclosed herein. In some examples, aspects of the operations of 2415 may be performed by a DCI manager 1630 as described herein with reference to FIG. 16.

At 2420, the method may include transmitting the data message in accordance with the scheduling information. The operations of block 2420 may be performed in accordance with examples as disclosed herein. In some examples, aspects of the operations of 2420 may be performed by a data message manager 1635 as described herein with reference to FIG. 16.

The following provides an overview of aspects of the present disclosure:

Aspect 1: A method for wireless communication by a UE, comprising: receiving a control message indicating a coding rate value corresponding to a DCI format, wherein the coding rate value is indicative of a coding rate of the DCI format; receiving, via a quantity of REs that is based at least in part on a payload size and the coding rate value, a DCI message of the DCI format that includes scheduling information associated with a data message; and receiving the data message in accordance with the scheduling information.

Aspect 2: The method of aspect 1, wherein receiving the DCI message comprises: receiving the DCI message via a PDCCH multiplexed with a PDSCH that carries the data message.

Aspect 3: The method of any of aspects 1 through 2, further comprising: receiving an indication of a coding rate of the data message, wherein the coding rate value indicates an offset associated with the coding rate of the data message.

Aspect 4: The method of any of aspects 1 through 3, wherein receiving the control message further comprises: receiving an indication that the coding rate value corresponds to a plurality of DCI formats including the DCI format.

Aspect 5: The method of aspect 4, further comprising: receiving, via a second quantity of REs that is based at least in part on a second payload size of a second DCI format and the coding rate value, a second DCI message of the second DCI format of the plurality of DCI formats.

Aspect 6: The method of any of aspects 1 through 5, wherein receiving the control message further comprises: receiving indications of a plurality of coding rate values including the coding rate value, wherein each of the plurality of coding rate values corresponds to a respective DCI format of a plurality of DCI formats.

Aspect 7: The method of aspect 6, wherein a second coding rate value corresponding to a second DCI format of the plurality of DCI formats indicates a second coding rate higher than the coding rate based at least in part on a second payload size of the second DCI format being larger than the payload size.

Aspect 8: The method of any of aspects 6 through 7, wherein a second coding rate value corresponding to a second DCI format of the plurality of DCI formats indicates a second coding rate lower than the coding rate based at least in part on a second payload size of the second DCI format being smaller than the payload size.

Aspect 9: The method of any of aspects 1 through 8, further comprising: selecting the quantity of REs via which the DCI message is received based at least in part on a second quantity of REs associated with a second DCI format with a largest payload size relative to other DCI formats, wherein the quantity of REs equals the second quantity of REs.

Aspect 10: The method of any of aspects 1 through 9, further comprising: selecting the quantity of REs via which the DCI message is received based at least in part on a second quantity of REs associated with a second DCI format with a smallest payload size relative to other DCI formats, wherein the quantity of REs equals the second quantity of REs.

Aspect 11: The method of any of aspects 1 through 10, further comprising: demodulating a plurality of REs of a PDCCH; and performing, using the plurality of REs, one or more BD attempts for the DCI message in accordance with the payload size and the coding rate value, wherein receiving the DCI message is based at least in part on performing the one or more BD attempts.

Aspect 12: The method of aspect 11, wherein performing the one or more BD attempts further comprises: performing a first set of one or more BD attempts using one or more first RE sets each associated with a first aggregation level; and performing a second set of one or more BD attempts using one or more second RE sets each associated with a second aggregation level, wherein each of the one or more first RE sets and the one or more second RE sets at least partially span the plurality of REs, and wherein the quantity of REs via which the DCI message is received is further based at least in part on the first aggregation level or the second aggregation level.

Aspect 13: The method of any of aspects 1 through 12, wherein receiving the control message further comprises: receiving an indication that both a first coding rate value and a second coding rate value correspond to the DCI format, wherein the first coding rate value and the second coding rate value are indicative of a first coding rate and a second coding rate, respectively, of the DCI format, and wherein the coding rate value is one of the first coding rate value and the second coding rate value.

Aspect 14: The method of aspect 13, further comprising: demodulating a plurality of REs of a PDCCH; and performing, using the plurality of REs, one or more BD attempts for the DCI message in accordance with both the first coding rate value and the second coding rate value.

Aspect 15: The method of aspect 14, wherein performing the one or more BD attempts in accordance with both the first coding rate value and the second coding rate value further comprises: performing a first set of one or more BD attempts using one or more first RE sets each associated with a first quantity of REs that is based at least in part on the payload size and the first coding rate value; and performing a second set of one or more BD attempts using one or more second RE sets each associated with a second quantity of REs that is based at least in part on the payload size and the second coding rate value, wherein each of the one or more first RE sets and the one or more second RE sets at least partially span the plurality of REs, and wherein the quantity of REs via which the DCI message is received is one of the first quantity of REs or the second quantity of REs.

Aspect 16: The method of any of aspects 1 through 15, further comprising: demodulating a first plurality of REs of a PDCCH in accordance with a first modulation scheme; performing, using the first plurality of REs demodulated in accordance with the first modulation scheme, a first set of one or more BD attempts for the DCI message in accordance with the payload size and the coding rate value; demodulating a second plurality of REs of the PDCCH in accordance with a second modulation scheme, the second plurality of REs at least partially overlapping with the first plurality of REs; and performing, using the second plurality of REs demodulated in accordance with the second modulation scheme, a second set of one or more BD attempts for the DCI message in accordance with the payload size and the coding rate value, wherein receiving the DCI message is based at least in part on performing one of the first set of one or more BD attempts or the second set of one or more BD attempts.

Aspect 17: The method of any of aspects 1 through 16, wherein each of a plurality of DCI formats including the DCI format is associated with a respective quantity of REs based at least in part on a respective payload size and a respective coding rate value.

Aspect 18: The method of any of aspects 1 through 17, wherein a resource allocation unit associated with the DCI format is a function of the payload size, the quantity of REs being further based at least in part on the resource allocation unit.

Aspect 19: The method of any of aspects 1 through 18, wherein the control message is received via a RRC message, a MAC-CE message, or a previous DCI message.

Aspect 20: A method for wireless communication by a network entity, comprising: transmitting a control message indicating a coding rate value corresponding to a DCI format, wherein the coding rate value is indicative of a coding rate of the DCI format; transmitting, via a quantity of REs that is based at least in part on a payload size and the coding rate value, a DCI message of the DCI format that includes scheduling information associated with a data message; and transmitting the data message in accordance with the scheduling information.

Aspect 21: The method of aspect 20, wherein transmitting the DCI message comprises: transmitting the DCI message via a PDCCH multiplexed with a PDSCH that carries the data message.

Aspect 22: The method of any of aspects 20 through 21, further comprising: transmitting an indication of a coding rate of the data message, wherein the coding rate value indicates an offset associated with the coding rate of the data message.

Aspect 23: The method of any of aspects 20 through 22, wherein transmitting the control message further comprises: transmitting an indication that the coding rate value corresponds to a plurality of DCI formats including the DCI format.

Aspect 24: The method of aspect 23, further comprising: transmitting, via a second quantity of REs that is based at least in part on a second payload size of a second DCI format and the coding rate value, a second DCI message of the second DCI format of the plurality of DCI formats.

Aspect 25: The method of any of aspects 20 through 24, wherein transmitting the control message further comprises: transmitting indications of a plurality of coding rate values including the coding rate value, each of the plurality of coding rate values corresponding to a respective DCI format of a plurality of DCI formats.

Aspect 26: The method of aspect 25, wherein a second coding rate value corresponding to a second DCI format of the plurality of DCI formats indicates a second coding rate higher than the coding rate based at least in part on a second payload size of the second DCI format being larger than the payload size.

Aspect 27: The method of any of aspects 25 through 26, wherein a second coding rate value corresponding to a second DCI format of the plurality of DCI formats indicates a second coding rate lower than the coding rate based at least in part on a second payload size of the second DCI format being smaller than the payload size.

Aspect 28: The method of any of aspects 20 through 27, further comprising: selecting the quantity of REs via which the DCI message is transmitted based at least in part on a second quantity of REs associated with a second DCI format with a largest payload size relative to other DCI formats, wherein the quantity of REs equals the second quantity of REs.

Aspect 29: The method of any of aspects 20 through 28, further comprising: selecting the quantity of REs via which the DCI message is transmitted based at least in part on a second quantity of REs associated with a second DCI format with a smallest payload size relative to other DCI formats, wherein the quantity of REs equals the second quantity of REs.

Aspect 30: The method of any of aspects 20 through 29, wherein transmitting the DCI message comprises: transmitting the DCI message in accordance with an aggregation level, wherein the quantity of REs via which the DCI message is transmitted is further based at least in part on the aggregation level.

Aspect 31: The method of any of aspects 20 through 30, wherein transmitting the control message further comprises: transmitting an indication that both a first coding rate value and a second coding rate value correspond to the DCI format, wherein the first coding rate value and the second coding rate value are indicative of a first coding rate and a second coding rate, respectively, of the DCI format, and wherein the coding rate value is one of the first coding rate value and the second coding rate value.

Aspect 32: The method of aspect 31, wherein transmitting the DCI message comprises: transmitting a first DCI message of the DCI format via a first quantity of REs that is based at least in part on the payload size and the first coding rate value; or transmitting a second DCI message of the DCI format via a second quantity of REs that is based at least in part on the payload size and the second coding rate value.

Aspect 33: The method of any of aspects 20 through 32, wherein transmitting the DCI message comprises: transmitting the DCI message in accordance with a modulation scheme, wherein the quantity of REs via which the DCI message is transmitted is further based at least in part on the modulation scheme.

Aspect 34: The method of any of aspects 20 through 33, wherein each of a plurality of DCI formats including the DCI format is associated with a respective quantity of REs based at least in part on a respective payload size and a respective coding rate value.

Aspect 35: The method of any of aspects 20 through 34, wherein a resource allocation unit associated with the DCI format is a function of the payload size, the quantity of REs being further based at least in part on the resource allocation unit.

Aspect 36: The method of any of aspects 20 through 35, wherein the control message is transmitted via a RRC message, a MAC-CE message, or a previous DCI message.

Aspect 37: A UE for wireless communication, comprising at least one processor, and at least one memory coupled with the at least one processor, with instructions stored in the at least one memory, the instructions being executable by the at least one processor, individually or in any combination, to cause the UE to perform a method of any of aspects 1 through 19.

Aspect 38: A UE for wireless communication, comprising at least one means for performing a method of any of aspects 1 through 19.

Aspect 39: A non-transitory computer-readable medium storing code for wireless communication, the code comprising instructions executable by at least one processor to perform a method of any of aspects 1 through 19.

Aspect 40: A network entity for wireless communication, comprising at least one processor, and at least one memory coupled with the at least one processor, with instructions stored in the at least one memory, the instructions being executable by the at least one processor, individually or in any combination, to cause the network entity to perform a method of any of aspects 20 through 36.

Aspect 41: A network entity for wireless communication, comprising at least one means for performing a method of any of aspects 20 through 36.

Aspect 42: A non-transitory computer-readable medium storing code for wireless communication, the code comprising instructions executable by at least one processor to perform a method of any of aspects 20 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as any combination of computing devices (e.g., any combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
at least one processor; and at least one memory coupled with the at least one processor, with instructions stored in the at least one memory, the instructions being executable by the at least one processor, individually or in any combination, to cause the UE to:
receive a control message indicating a coding rate value corresponding to a downlink control information format, wherein the coding rate value is indicative of a coding rate of the downlink control information format;
receive, via a quantity of resource elements that is based at least in part on a payload size of the downlink control information format, the coding rate value, and a resource allocation unit, a downlink control information message of the downlink control information format that includes scheduling information associated with a data message, wherein the resource allocation unit is a function of the payload size of the downlink control information format; and
receive the data message in accordance with the scheduling information.

2. The UE of claim 1, wherein the instructions to receive the downlink control information message are executable by the at least one processor, individually or in any combination, to cause the UE to:
receive the downlink control information message via a physical downlink control channel multiplexed with a physical downlink shared channel that carries the data message.

3. The UE of claim 1, wherein the instructions are further executable by the at least one processor, individually or in any combination, to cause the UE to:
receive an indication of a coding rate of the data message, wherein the coding rate value indicates an offset associated with the coding rate of the data message.

4. The UE of claim 1, wherein the instructions to receive the control message are further executable by the at least one processor, individually or in any combination, to cause the UE to:
receive an indication that the coding rate value corresponds to a plurality of downlink control information formats including the downlink control information format.

5. The UE of claim 4, wherein the instructions are further executable by the at least one processor, individually or in any combination, to cause the UE to:
receive, via a second quantity of resource elements that is based at least in part on a second payload size of a second downlink control information format and the coding rate value, a second downlink control information message of the second downlink control information format of the plurality of downlink control information formats.

6. The UE of claim 1, wherein the instructions to receive the control message are further executable by the at least one processor, individually or in any combination, to cause the UE to:
receive indications of a plurality of coding rate values including the coding rate value, wherein each of the plurality of coding rate values corresponds to a respective downlink control information format of a plurality of downlink control information formats.

7. The UE of claim 6, wherein a second coding rate value corresponding to a second downlink control information format of the plurality of downlink control information formats indicates a second coding rate higher than the coding rate based at least in part on a second payload size of the second downlink control information format being larger than the payload size.

8. The UE of claim 6, wherein a second coding rate value corresponding to a second downlink control information format of the plurality of downlink control information formats indicates a second coding rate lower than the coding rate based at least in part on a second payload size of the second downlink control information format being smaller than the payload size.

9. The UE of claim 1, wherein the instructions are further executable by the at least one processor, individually or in any combination, to cause the UE to:

select the quantity of resource elements via which the downlink control information message is received based at least in part on a second quantity of resource elements associated with a second downlink control information format with a largest payload size relative to other downlink control information formats, wherein the quantity of resource elements equals the second quantity of resource elements.

10. The UE of claim 1, wherein the instructions are further executable by the at least one processor, individually or in any combination, to cause the UE to:

select the quantity of resource elements via which the downlink control information message is received based at least in part on a second quantity of resource elements associated with a second downlink control information format with a smallest payload size relative to other downlink control information formats, wherein the quantity of resource elements equals the second quantity of resource elements.

11. The UE of claim 1, wherein the instructions are further executable by the at least one processor, individually or in any combination, to cause the UE to:

demodulate a plurality of resource elements of a physical downlink control channel; and perform, using the plurality of resource elements, one or more blind decoding attempts for the downlink control information message in accordance with the payload size and the coding rate value, wherein receiving the downlink control information message is based at least in part on performing the one or more blind decoding attempts.

12. The UE of claim 11, wherein the instructions to perform the one or more blind decoding attempts are further executable by the at least one processor, individually or in any combination, to cause the UE to:

perform a first set of one or more blind decoding attempts using one or more first resource element sets each associated with a first aggregation level; and perform a second set of one or more blind decoding attempts using one or more second resource element sets each associated with a second aggregation level, wherein each of the one or more first resource element sets and the one or more second resource element sets at least partially span the plurality of resource elements, and wherein the quantity of resource elements via which the downlink control information message is received is further based at least in part on the first aggregation level or the second aggregation level.

13. The UE of claim 1, wherein the instructions to receive the control message are further executable by the at least one processor, individually or in any combination, to cause the UE to:

receive an indication that both a first coding rate value and a second coding rate value correspond to the downlink control information format, wherein the first coding rate value and the second coding rate value are indicative of a first coding rate and a second coding rate, respectively, of the downlink control information format, and wherein the coding rate value is one of the first coding rate value and the second coding rate value.

14. The UE of claim 13, wherein the instructions are further executable by the at least one processor, individually or in any combination, to cause the UE to:

demodulate a plurality of resource elements of a physical downlink control channel; and perform, using the plurality of resource elements, one or more blind decoding attempts for the downlink control information message in accordance with both the first coding rate value and the second coding rate value.

15. The UE of claim 14, wherein the instructions to perform the one or more blind decoding attempts in accordance with both the first coding rate value and the second coding rate value are further executable by the at least one processor, individually or in any combination, to cause the UE to:

perform a first set of one or more blind decoding attempts using one or more first resource element sets each associated with a first quantity of resource elements that is based at least in part on the payload size and the first coding rate value; and perform a second set of one or more blind decoding attempts using one or more second resource element sets each associated with a second quantity of resource elements that is based at least in part on the payload size and the second coding rate value, wherein each of the one or more first resource element sets and the one or more second resource element sets at least partially span the plurality of resource elements, and wherein the quantity of resource elements via which the downlink control information message is received is one of the first quantity of resource elements or the second quantity of resource elements.

16. The UE of claim 1, wherein the instructions are further executable by the at least one processor, individually or in any combination, to cause the UE to:

demodulate a first plurality of resource elements of a physical downlink control channel in accordance with a first modulation scheme;

perform, using the first plurality of resource elements demodulated in accordance with the first modulation scheme, a first set of one or more blind decoding attempts for the downlink control information message in accordance with the payload size and the coding rate value;

demodulate a second plurality of resource elements of the physical downlink control channel in accordance with a second modulation scheme, the second plurality of resource elements at least partially overlapping with the first plurality of resource elements; and perform, using the second plurality of resource elements demodulated in accordance with the second modulation scheme, a second set of one or more blind decoding attempts for the downlink control information message in accordance with the payload size and the coding rate value, wherein receiving the downlink control information message is based at least in part on performing one of the first set of one or more blind decoding attempts or the second set of one or more blind decoding attempts.

17. The UE of claim 1, wherein each of a plurality of downlink control information formats including the downlink control information format is associated with a respective quantity of resource elements based at least in part on a respective payload size and a respective coding rate value.

18. The UE of claim 1, wherein the control message is received via a radio resource control message, a medium access control-control element (MAC-CE) message, or a previous downlink control information message.

19. A network entity for wireless communication, comprising:

at least one processor; and at least one memory coupled with the at least one processor, with instructions stored in the at least one memory, the instructions being executable by the at least one processor, individually or in any combination, to cause the network entity to:

transmit a control message indicating a coding rate value corresponding to a downlink control information format, wherein the coding rate value is indicative of a coding rate of the downlink control information format;

transmit, via a quantity of resource elements that is based at least in part on a payload size of the downlink control information format, the coding rate value, and a resource allocation unit, a downlink control information message of the downlink control information format that includes scheduling information associated with a data message, wherein the resource allocation unit is a function of the payload size of the downlink control information format; and transmit the data message in accordance with the scheduling information.

20. The network entity of claim 19, wherein the instructions to transmit the downlink control information message are executable by the at least one processor, individually or in any combination, to cause the network entity to:

transmit the downlink control information message via a physical downlink control channel multiplexed with a physical downlink shared channel that carries the data message.

21. The network entity of claim 19, wherein the instructions are further executable by the at least one processor, individually or in any combination, to cause the network entity to:

transmit an indication of a coding rate of the data message, wherein the coding rate value indicates an offset associated with the coding rate of the data message.

22. The network entity of claim 19, wherein the instructions to transmit the control message are further executable by the at least one processor, individually or in any combination, to cause the network entity to:

transmit an indication that the coding rate value corresponds to a plurality of downlink control information formats including the downlink control information format.

23. The network entity of claim 19, wherein the instructions to transmit the control message are further executable by the at least one processor, individually or in any combination, to cause the network entity to:

transmit indications of a plurality of coding rate values including the coding rate value, each of the plurality of coding rate values corresponding to a respective downlink control information format of a plurality of downlink control information formats.

24. The network entity of claim 19, wherein the instructions are further executable by the at least one processor, individually or in any combination, to cause the network entity to:

select the quantity of resource elements via which the downlink control information message is transmitted based at least in part on a second quantity of resource elements associated with a second downlink control information format with a largest payload size relative to other downlink control information formats, wherein the quantity of resource elements equals the second quantity of resource elements.

25. The network entity of claim 19, wherein the instructions to transmit the control message are further executable by the at least one processor, individually or in any combination, to cause the network entity to:

transmit an indication that both a first coding rate value and a second coding rate value correspond to the downlink control information format, wherein the first coding rate value and the second coding rate value are indicative of a first coding rate and a second coding rate, respectively, of the downlink control information format, and wherein the coding rate value is one of the first coding rate value and the second coding rate value.

26. The network entity of claim 25, wherein the instructions to transmit the downlink control information message are executable by the at least one processor, individually or in any combination, to cause the network entity to:

transmit a first downlink control information message of the downlink control information format via a first quantity of resource elements that is based at least in part on the payload size and the first coding rate value; or transmit a second downlink control information message of the downlink control information format via a second quantity of resource elements that is based at least in part on the payload size and the second coding rate value.

27. The network entity of claim 19, wherein the control message is transmitted via a radio resource control message, a medium access control-control element (MAC-CE) message, or a previous downlink control information message.

28. A method for wireless communication by a user equipment (UE), comprising:

receiving a control message indicating a coding rate value corresponding to a downlink control information format, wherein the coding rate value is indicative of a coding rate of the downlink control information format;

receiving, via a quantity of resource elements that is based at least in part on a payload size of the downlink control information format, the coding rate value, and a resource allocation unit, a downlink control information message of the downlink control information format that includes scheduling information associated with a data message, wherein the resource allocation unit is a function of the payload size of the downlink control information format; and receiving the data message in accordance with the scheduling information.

29. A method for wireless communication by a network entity, comprising:

transmitting a control message indicating a coding rate value corresponding to a downlink control information format, wherein the coding rate value is indicative of a coding rate of the downlink control information format;

transmitting, via a quantity of resource elements that is based at least in part on a payload size of the downlink control information format, the coding rate value, and a resource allocation unit, a downlink control information message of the downlink control information format that includes scheduling information associated with a data message, wherein the resource allocation unit is a function of the payload size of the downlink control information format; and transmitting the data message in accordance with the scheduling information.

* * * * *